US011175246B2

(12) United States Patent
Lintern

(10) Patent No.: US 11,175,246 B2
(45) Date of Patent: Nov. 16, 2021

(54) METHOD AND SYSTEM FOR X-RAY FLUORESCENCE (XRF) ANALYSIS OF EXPLORATION SAMPLES

(71) Applicant: COMMONWEALTH SCIENTIFIC AND INDUSTRIAL RESEARCH ORGANISATION, Acton (AU)

(72) Inventor: Melvyn Lintern, Acton (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 0 days.

(21) Appl. No.: 16/314,221

(22) PCT Filed: Jun. 30, 2017

(86) PCT No.: PCT/AU2017/050676
§ 371 (c)(1),
(2) Date: Dec. 28, 2018

(87) PCT Pub. No.: WO2018/000046
PCT Pub. Date: Jan. 4, 2018

(65) Prior Publication Data
US 2019/0234890 A1  Aug. 1, 2019

(30) Foreign Application Priority Data

Jun. 30, 2016 (GB) .................................. 1611434

(51) Int. Cl.
*G01N 23/22* (2018.01)
*G01N 23/2202* (2018.01)
(Continued)

(52) U.S. Cl.
CPC ......... *G01N 23/223* (2013.01); *C22B 3/0001* (2013.01); *C22B 3/0002* (2013.01);
(Continued)

(58) Field of Classification Search
CPC .. G01N 23/203; G01N 23/22; G01N 23/2202; G01N 23/2206; G01N 23/2208;
(Continued)

(56) References Cited

U.S. PATENT DOCUMENTS 4,188,208 A * 2/1980 Guay .................. C22B 3/24
205/569
4,362,935 A * 12/1982 Clark, III ............. G01N 23/223
378/48
(Continued)

FOREIGN PATENT DOCUMENTS

EP  0 049 172  4/1982

OTHER PUBLICATIONS

Emsal Yanuar, et al., "Leaching and Adsorption of Gold from Lape-Sumbawa Rocks (Indonesia) by Hypochlorite-Chloride", 3rd International Seminar on Chemistry 2014, Procedia Chemistry 17, 2015, pp. 59-65.
(Continued)

*Primary Examiner* — Allen C. Ho
(74) *Attorney, Agent, or Firm* — Nixon & Vanderhye

(57) ABSTRACT

A collector device for determining a metal in an exploration sample containing a concentration of the metal not directly detectable by X-ray fluorescence (XRF), comprises an adsorbent material capable of concentrating metal from a digestion mixture produced by digesting the exploration sample, which is configured for association with an analysis window of the XRF detector to facilitate determination of the amount of metal value in the exploration sample. A sample preparation vessel, method and system used to prepare exploration samples for analysis includes a vessel for receiving the exploration sample, a digestion tablet and a digestion medium; a closure to allow the vessel to be agitated to produce a digestion mixture comprising dis-
(Continued)

solved metal and the collector device. The closure and the collector device are coupled so that collector device is retrieved from the vessel by removing the closure. The digestion tablet includes a metal lixiviate and an alkali compound.

46 Claims, 12 Drawing Sheets

(51) Int. Cl.
*G01N 23/2204* (2018.01)
*G01N 23/223* (2006.01)
*C22B 3/02* (2006.01)
*C22B 3/04* (2006.01)
*G01N 1/40* (2006.01)
*C22B 3/00* (2006.01)
*C22B 3/14* (2006.01)
*G01N 1/38* (2006.01)

(52) U.S. Cl.
CPC ............... *G01N 1/38* (2013.01); *G01N 1/405* (2013.01); *G01N 1/4044* (2013.01); *G01N 23/22* (2013.01); *G01N 23/2202* (2013.01); *G01N 2223/076* (2013.01); *G01N 2223/301* (2013.01); *G01N 2223/307* (2013.01); *G01N 2223/616* (2013.01)

(58) Field of Classification Search
CPC ........... G01N 23/223; G01N 2223/076; G01N 2223/301; G01N 2223/307; G01N 2223/616; G01N 23/2204; C22B 3/00; C22B 3/0001; C22B 3/0002; C22B 3/0098
USPC .............................................. 378/44–50, 208
See application file for complete search history.

(56) References Cited

U.S. PATENT DOCUMENTS

| | | | | |
|---|---|---|---|---|
| 4,429,409 A * | 1/1984 | Berry | ................... | G01N 23/223 340/146.2 |
| 4,978,559 A * | 12/1990 | Iacovangelo | ........... | C23C 18/44 106/1.13 |
| 4,979,988 A * | 12/1990 | Iacovangelo | ........... | C23C 18/44 106/1.18 |
| 4,985,076 A * | 1/1991 | Iacovangelo | ........... | C23C 18/44 106/1.25 |
| 5,014,287 A * | 5/1991 | Thornton | ............. | G01N 23/223 250/369 |
| 5,130,168 A * | 7/1992 | Mathe | ..................... | C23C 18/44 106/1.23 |
| 5,133,892 A * | 7/1992 | Chun | ................. | C11D 3/38672 510/224 |
| 5,260,069 A * | 11/1993 | Chen | .................... | A61K 9/0004 424/438 |
| 5,274,688 A * | 12/1993 | Grodzins | ............. | G01N 23/223 378/44 |
| 5,300,304 A * | 4/1994 | Sheth | ................... | A61K 9/5015 424/490 |
| 5,338,343 A * | 8/1994 | Kroll | ....................... | C23C 18/44 106/1.23 |
| 5,449,397 A * | 9/1995 | Hunter | ..................... | C22B 3/18 423/DIG. 17 |
| 5,536,297 A * | 7/1996 | Marchbank | ............... | C22B 3/08 75/736 |
| 5,612,431 A * | 3/1997 | Waddell | ................ | C08F 220/38 423/27 |
| 5,818,899 A * | 10/1998 | Connolly | ........... | G01N 23/2076 378/45 |
| 5,961,833 A * | 10/1999 | Green | .................. | B01D 61/027 210/638 |
| 6,097,785 A * | 8/2000 | Elam | ..................... | G01N 23/223 250/253 |
| 6,295,333 B1 * | 9/2001 | Tamura | ................. | G01N 23/223 378/44 |
| 6,344,068 B1 * | 2/2002 | Fleming | ................. | C22B 11/04 423/24 |
| 6,359,962 B1 * | 3/2002 | Yagi | ..................... | G01N 23/223 378/44 |
| 6,459,767 B1 * | 10/2002 | Boyer | .................. | G01N 23/223 378/121 |
| 6,477,227 B1 * | 11/2002 | Kaiser | .................. | G01N 23/223 378/45 |
| 6,623,759 B2 * | 9/2003 | Heese | ................... | A61K 9/5073 424/461 |
| 6,660,059 B2 * | 12/2003 | Ji | .............................. | C22B 3/08 75/744 |
| 6,833,021 B1 * | 12/2004 | Hourn | ....................... | C22B 3/12 75/744 |
| 6,909,770 B2 * | 6/2005 | Schramm | .............. | G01N 23/223 378/44 |
| 7,065,174 B2 * | 6/2006 | Sipilä | .................. | G01N 23/223 378/44 |
| 7,157,062 B2 * | 1/2007 | Perez | ...................... | C22B 11/08 423/25 |
| 7,285,256 B2 * | 10/2007 | Wan | .......................... | C22B 3/42 423/22 |
| 7,443,951 B2 * | 10/2008 | Kenning | ............. | G01N 23/223 378/102 |
| 7,572,317 B2 * | 8/2009 | Choi | ......................... | C22B 3/08 75/734 |
| 7,634,054 B2 * | 12/2009 | Matoba | ................ | G01N 23/223 378/46 |
| 7,648,643 B1 * | 1/2010 | Creasey | .................. | C22B 11/04 252/183.11 |
| 7,680,248 B2 * | 3/2010 | Matoba | .................. | H01J 35/08 378/140 |
| 7,722,840 B2 * | 5/2010 | Hackl | ...................... | C22B 3/08 423/27 |
| 7,796,726 B1 * | 9/2010 | Gendreau | ............. | G01N 23/20 378/44 |
| 7,916,834 B2 * | 3/2011 | Piorek | .................. | G01N 23/223 378/102 |
| 7,964,015 B2 * | 6/2011 | Creasey | .................. | C22B 3/22 75/739 |
| 8,613,791 B2 * | 12/2013 | Singh | ........................ | C22B 3/04 75/710 |
| 8,728,303 B2 * | 5/2014 | Young | .................... | C10G 27/12 208/251 R |
| 8,728,304 B2 * | 5/2014 | Gallup | .................. | C10G 17/07 208/251 R |
| 8,894,740 B2 * | 11/2014 | Harris | ................... | C22B 3/065 75/744 |
| 8,906,228 B2 * | 12/2014 | O'Rear | .................. | C10G 27/02 208/251 R |
| 8,936,667 B2 * | 1/2015 | Padayachee | .............. | C22B 3/24 75/722 |
| 8,992,769 B2 * | 3/2015 | O'Rear | .................. | C10G 29/205 208/251 R |
| 8,999,034 B2 * | 4/2015 | Richardson | ............. | C22B 11/04 423/25 |
| 9,051,625 B2 * | 6/2015 | Choi | ......................... | C22B 3/42 |
| 9,447,675 B2 * | 9/2016 | Yean | ....................... | E21B 43/38 |
| 9,488,605 B2 * | 11/2016 | Feser | ...................... | G01N 33/24 |
| 9,689,815 B2 * | 6/2017 | Jones | .................. | G01N 23/223 |
| 9,693,962 B2 * | 7/2017 | Kawano | ................ | A61K 9/2013 |
| 9,803,260 B2 * | 10/2017 | Zhou | ........................ | C22B 1/00 |
| 9,920,395 B2 * | 3/2018 | Davis | ...................... | C22B 11/04 |
| 9,982,320 B2 * | 5/2018 | Liddell | .................. | C22B 11/04 |
| 10,047,412 B2 * | 8/2018 | Yahorava | ................ | C22B 11/08 |
| 10,078,060 B2 * | 9/2018 | Geier | .................. | G01N 23/223 |
| 10,301,180 B2 * | 5/2019 | Hatano | .................. | C01G 7/003 |
| 10,392,679 B2 * | 8/2019 | Hatano | ................. | C01B 17/033 |

(56) References Cited

U.S. PATENT DOCUMENTS

| 10,480,046 | B2* | 11/2019 | Eksteen | .................... C22B 3/12 |
| 10,487,374 | B2* | 11/2019 | Dahal | ................... C22B 13/045 |
| 2014/0072095 | A1 | 3/2014 | Feser et al. | |

OTHER PUBLICATIONS

International Search Report for PCT/AU2017/050676 dated Sep. 20, 2017, 7 pages.

Written Opinion of the ISA for PCT/AU2017/050676 dated Sep. 20, 2017, 6 pages.

"Sampling, storage and sample preparation procedures for X ray fluorescence analysis of environmental materials" *International Atomic Energy Agency* (*IAEA*), vol. 28, No. 18, pp. 1-55 (Jun. 1997).

Margui, E. et al., "Analytical capabilities of laboratory, benchtop and handheld X-ray fluorescence systems for detection of metals in aqueous samples pre-concentrated with solid-phase extraction disks," Spectrochimica Acta Part B 67 (2012) 17-23.

\* cited by examiner

METHOD AND SYSTEM FOR X-RAY FLUORESCENCE (XRF) ANALYSIS OF EXPLORATION SAMPLES

This application is the U.S. national phase of International Application No. PCT/AU2017/050676 filed Jun. 30, 2017 which designated the U.S. and claims priority to GB 1611434.0 filed Jun. 30, 2016, the entire contents of each of which are hereby incorporated by reference.

FIELD

The present disclosure generally relates to a method and system for X-ray fluorescence (XRF) analysis of exploration samples, for use during a field mineral exploration sampling campaign, in particular exploration samples having a concentration of metal that is not directly detectable by XRF.

The present disclosure also relates to a digestion composition and a digestion tablet which may be used to prepare exploration samples for XRF analysis according to the method and system described herein. The present disclosure further relates to a sample preparation vessel, method and system which may be used to prepare exploration samples for XRF analysis according to the method and system described herein.

The present disclosure also relates to a collector device for concentrating dissolved metal in a digestion mixture. The collector device interfaces with an XRF detector arranged to measure the amount of adsorbed metal collected on the collector device.

BACKGROUND

Mineral exploration campaigns are frequently conducted in remote areas and involve collection of numerous geological samples including, but not limited to soil samples, drill cutting samples and stream sediment samples. Once collected, the samples are typically transported to a laboratory for analysis to determine the concentration of metal in the sample. Many of the available analytical techniques involve acid extraction, fire assay or fusion techniques followed by spectrometric or spectrophotometric analysis for quantification of the metal. These relatively sophisticated chemical methods are generally not suitable for remote field use and require high power consumption, clean conditions, stable temperatures and constant electrical output. A fire assay furnace, for example, commonly requires tens of kW of power and 460V.

As most laboratories capable of performing the necessary analysis are located in urban areas, it can take a period of several days, weeks or even months to have the samples analysed and data interpreted, leading to prolonged periods before the results of a mineral exploration campaign are known.

One of the more difficult metals to analyse in geological samples is gold. Electrochemical and colorimetry have been previously proposed as being suitable for analysing gold in the field. Both these techniques are time consuming and have not been adopted by the mineral exploration industry in recent times. They are not suitable for rapid routine analyses as they require sophisticated set ups in the form of a stand-alone chemical laboratory, skilled personnel to prepare the samples for analysis, and expert knowledge to perform and interpret the sample analyses.

Although portable X-ray fluorescence (pXRF) detectors are used in the field for mineral analysis, they are not generally used for gold analysis because a) the detection threshold for gold is high, b) the concentration of gold in collected samples is typically low (<1 ppm) and below the detection threshold, and c) many samples include other metals or elements that provide spectral interferences which preclude the reliable detection of gold by this method.

US Patent Application Publication No. 2014072095 describes the application of a combination of x-ray computed tomography and x-ray fluorescence to evaluate a sample, in particular tailings from mining operations with low dispersion of platinum and gold particles throughout. Identification of the platinum and gold particles is typically difficult because of their poor dispersion through tailings, however, this limitation is addressed by first using x-ray computed tomography (CT) to obtain a three-dimensional image of the sample. An operator selects regions of interest from features of interest in the CT measurement of the sample, then subsequently acquires x-ray fluorescence spectra from the defined regions of interest and matches the XRF spectra with elemental information for identification. The regions of interest are typically a small number of micron sized grains where the platinum resides.

While the coupling of high resolution x-ray CT with XRF helps mitigate the inherent limitations of sample size, it is still reliant on identifying regions in the sample where the metal concentration is above a detection threshold for the XRF. Additionally, the technique is subject to correctly identifying 'regions of interest' prior to making any measurement with respect to verifying the liberation state of the elements within the sample. It does not provide an indication of the concentration of the metal of interest in the sample.

The technique described in US Patent Application Publication No. 2014072095 is not applicable in the field during exploration campaigns for several reasons. Firstly, it is designed for understanding where and how metals are located, not for routine analysis. Secondly, it deploys sophisticated analytical equipment which requires a stable power supply, purpose-built laboratory space. Furthermore, the equipment would be difficult to transport. This technique is designed for processing, not exploration and detection levels would be high and only suitable for ore grade materials that typically have gold concentrations >1 ppm.

Thus, there is a need to develop a simple on-site method for preparing and analysing exploration samples containing very low concentrations of gold and other elements which are not directly detectable by a pXRF detector. It would be advantageous to provide a method which is capable of preparing and analysing multiple small samples (e.g. 100× 250 g samples) within a 24 h turnaround period. Furthermore, on site analysis is particularly advantageous to a mineral explorer as prompt access to analytical results permits near-real time decision making in respect to continuation or amendment of an exploration program.

European Patent Application Publication No. 0049172 A1 describes a recovery process for a precious metal from solution by adsorbing a dissolved compound of the precious metal onto a fibrous body of activated carbon. The concentration of dissolved precious metal may be relatively high, for example 80-120 ppm for gold and 40-50 ppm for silver. The fibrous body is subsequently treated with a liquid stripping composition to give a solution containing the dissolved precious metal and the fibrous body of activated carbon subsequently forms the anode in an electrowinning process to recover the precious metal in solution.

In this recovery process application, the scale is necessarily large and the fibrous body may be in the form of a belt which is continuously cycled between the adsorption stage to the recovery stage. The activated carbon fibres can be periodically reactivated by heating to about 250° C. to remove surface contamination and regenerate adsorptive activity. The scale of the operation as described is neither conducive to analysis of multiple small samples within a 24 hour turnaround period nor transportable to different sites as the exploration campaign progresses.

SUMMARY

The present disclosure provides a digestion composition and a digestion tablet which may be used to prepare an exploration sample for XRF analysis to determine a metal concentration, in particular for exploration samples containing low concentrations of a metal or a metalloid not directly detectable by XRF analysis.

The metal may be a precious metal, in particular gold, silver, platinum, palladium or another target metal such as nickel. Alternatively, the metal or metalloid may be a 'pathfinder', such as antimony, bismuth, indium, tellurium, thallium, tin, selenium, tungsten or molybdenum. A pathfinder is a metal or metalloid which is frequently associated with a deposit of an exploration target metal, such as gold or other precious metals. Typically, the pathfinder is found in greater concentrations than the target metal and therefore more likely to be identified (in principle). Identification of a pathfinder, even at low concentrations, may be indicative of a deposit containing the exploration target metal.

Certain embodiments of the disclosure provide a digestion composition comprising a metal lixiviant and an alkali compound.

Alternative embodiments of the disclosure provide a digestion tablet comprising a core portion containing a metal lixiviant, a layer of alkali compound encompassing the core portion, and an overcoat layer comprising a water soluble or water dispersible polymer.

Still other embodiments of the disclosure provide a digestion tablet comprising a core portion containing a mixture of a metal lixiviant and an alkali compound, and an overcoat layer comprising a water soluble or water dispersible polymer.

The digestion composition or the digestion tablet may comprise the metal lixiviant in an amount sufficient to dissolve a metal from a digestion mixture comprising an exploration sample containing a concentration of a metal not directly detectable by an XRF detector, the digestion composition or the digestion tablet, and a digestion medium. The digestion medium may be a solvent, such as an aqueous solvent, in which the digestion composition or the digestion tablet is soluble. In some embodiments, the digestion mixture comprises less than 10000 ppm metal lixiviant. It will be appreciated to those skilled in the art that the rate of digestion may be faster for higher concentrations of metal lixiviant in the digestion mixture. The rate of digestion may also be increased by increasing the amount of oxygen in the sample to facilitate digestion.

In one embodiment, the metal lixiviant in the digestion composition or the digestion tablet may be a cyanide compound. The cyanide compound may be a water soluble cyanide salt such as sodium cyanide, lithium cyanide or potassium cyanide.

In an alternative embodiment, the metal lixiviant in the digestion composition or the digestion tablet may be a halide compound, in particular a water soluble iodide such as potassium iodide, sodium iodide or ammonium iodide.

In another embodiment, the metal lixiviant in the digestion composition or the digestion tablet may be a thiosulphate compound, in particular a water soluble thiosulphate salt, such as ammonium thiosulphate.

In some embodiments the alkali compound may be an alkali metal hydroxide, an alkaline earth metal hydroxide, lime (CaO), soda ($Na_2O$), or a combination thereof.

One purpose of the alkali compound is to raise the pH of the digestion mixture to minimise the risk of forming hydrogen cyanide when the metal lixiviant is a cyanide compound. Moreover, an alkaline pH ensures that cyanide remains in solution and is available as the metal lixiviant. Accordingly, in one embodiment the alkali compound is present in an amount sufficient to maintain the pH of the digestion mixture above pH 7, preferably above pH 10.

In some embodiments, the digestion composition or the digestion tablet may further comprise an ionic salt in an amount sufficient to maintain an ionic strength of the digestion mixture to at least 0.1M. Suitable examples of ionic salts for this purpose include, but are not limited to sodium chloride, potassium chloride and other inert water soluble salts.

In some embodiments, the digestion composition or the digestion tablet may further comprise an accelerant or a catalyst. The term 'accelerant' as used herein refers to one of more substances capable of increasing the rate of digestion of the exploration sample and dissolution of the metal into a digestion medium. Suitable examples of accelerants include, but are not limited to, alkali or alkali earth metal peroxides and percarbonates or organic peroxides and percarbonates.

The present disclosure also provides a collector device for adsorbing dissolved metal from a digestion mixture and interfacing with an XRF detector arranged to measure the amount of adsorbed metal and thereby concentrated on the collector device, and consequently the amount of metal in the exploration sample.

Certain embodiments of the disclosure provide a collector device for determining a metal in an exploration sample containing a metal or metalloid not directly detectable by X-ray fluorescence (XRF). The collector device comprises an adsorbent material capable of concentrating metal from a digestion mixture produced by digesting the exploration sample, wherein the adsorbent material is configured for association with an analysis window of the XRF detector to facilitate determination by the XRF detector of the amount of metal in the exploration sample. In particular, the XRF detector may be a portable XRF (pXRF) detector.

In one embodiment the collector device comprises a plate of adsorbent material. The plate may be configured for association with the detector. For example, the plate may be a 25 mm disc of adsorbent material placed over an analysis window of the XRF detector. In this way, the plate entirely covers the analysis window of the XRF detector. Advantageously, a regular shape, such as a disc, may be placed over the window of the XRF detector in any orientation without jeopardising a precision of the measurement, provided that the window of the XRF detector is entirely covered.

In one embodiment, the adsorbent material may be a textile material. In one form the textile material may be an activated carbon cloth. Preferably, the textile material is capable of chemically adsorbing the dissolved metal.

In another embodiment, the collector device comprises a bed of adsorbent material, such as activated carbon granules or anion exchange resin beads. The bed may be configured for association with the detector. For example, the bed may be contained in a vessel having an interior space which defines the bed of adsorbent material. In this particular embodiment, the vessel may be configured to allow X-ray radiation to interact with the bed of adsorbent material.

In one embodiment the collector device may further comprise a permeable housing for the adsorbent material. The permeable housing prevents particulate material in the digestion mixture from abrading adsorbed metal from the adsorbent material. In one form, the permeable housing may be liquid permeable. For example, the permeable housing may be a mesh envelope containing the adsorbent material.

Another embodiment of the disclosure provides a reference standard device for use with an XRF detector. The reference standard device comprises an adsorbent material having a known amount of metal adsorbed thereon, wherein the adsorbent material is configured for association with an analysis window of the XRF detector.

The present disclosure also provides a sample preparation vessel for preparing an exploration sample containing a concentration of a metal not directly detectable by XRF for analysis by an XRF detector.

The sample preparation vessel comprises:

a vessel for receiving the exploration sample, a digestion composition or a digestion tablet, and a digestion medium;

a closure for the vessel to allow the vessel to be agitated and thereby produce a digestion mixture comprising dissolved metal and the digestion composition or the digestion tablet dissolved in the digestion medium; and, a collector device comprising an adsorbent material capable of concentrating dissolved metal from the digestion mixture, wherein the adsorbent material is configured for association with an analysis window of the XRF detector to facilitate determination by the XRF detector of the amount of metal in the exploration sample, wherein the closure and the collector device are coupled in a manner whereby the collector device is retrieved from the vessel by removing the closure therefrom.

In one example, the closure and the collector device are coupled by an elongate element. The elongate element may be flexible. For example, the elongate element may be a lanyard. Alternatively, the elongate element may be rigid. For example, the elongate element may be a permeable housing for the collector device.

The present disclosure also provides a system and a method for preparing an exploration sample containing a metal or metalloid not directly detectable by XRF for analysis by an XRF detector.

The system comprises:

a digestion composition or a digestion tablet containing an alkali compound and a metal lixiviant in an amount capable of dissolving the metal or metalloid from the exploration sample in a digestion medium;

a vessel for receiving the exploration sample, the digestion composition or the digestion tablet, and the digestion medium, the vessel having a closure for the vessel to allow the vessel to be agitated and thereby produce a digestion mixture comprising said dissolved metal and the digestion composition or the digestion tablet dissolved in the digestion medium; and, a collector device comprising an adsorbent material capable of concentrating dissolved metal from the digestion mixture, wherein the adsorbent material is configured for association with an analysis window of the XRF detector to facilitate determination by the XRF detector of the amount of metal in the exploration sample.

The method for preparing an exploration sample containing a metal or metalloid not directly detectable by XRF for analysis by an XRF detector, the method comprising:

mixing the exploration sample, a digestion medium and a digestion composition or a digestion tablet containing an alkali compound and a metal lixiviant in an amount capable of dissolving the metal or metalloid from the exploration sample in the digestion medium to produce a digestion mixture; and, contacting the digestion mixture with a collector device comprising an adsorbent material capable of concentrating dissolved metal or metalloid from the digestion mixture, wherein the adsorbent material is configured for association with an analysis window of the XRF detector to facilitate determination by an XRF detector of the amount of metal in the exploration sample.

The present disclosure also provides a digestion composition as described above for use with a method or a system for preparing an exploration sample containing a metal or metalloid not directly detectable by XRF for analysis by an XRF detector.

In another aspect, the present disclosure also provides a digestion tablet as described above for use with a method or a system for preparing an exploration sample containing a metal or metalloid not directly detectable by XRF for analysis by an XRF detector.

The present disclosure also provides a system and method for analysing an exploration sample containing a metal or metalloid not directly detectable by XRF.

The system comprises:

a digestion composition or a digestion tablet containing an alkali compound and a metal lixiviant in an amount capable of dissolving the metal or metalloid from the exploration sample in a digestion medium;

a collector device comprising an adsorbent material capable of concentrating dissolved metal from the digestion mixture, wherein the adsorbent material is configured for association with an analysis window of the XRF detector to facilitate determination by an XRF detector of the amount of metal in the exploration sample; and, an XRF detector arranged to detect the metal adsorbed on collector device.

In one embodiment the system further comprises a control device for controlling the XRF detector. The control device may comprise a memory for storing data and operation software, a controller that provides a user interface, and an external port for export of data.

The method of analysing an exploration sample containing a metal or metalloid not directly detectable by XRF comprises the steps of:

providing a digestion mixture comprising the exploration sample, a digestion medium and a digestion composition or a digestion tablet containing an alkali compound and a metal lixiviant in an amount capable of dissolving the metal or metalloid from the exploration sample in the digestion medium;

contacting the digestion mixture with a collector device comprising an adsorbent material capable of concentrating dissolved metal from the digestion mixture, wherein the adsorbent material is configured for association with an analysis window of the XRF detector to facilitate determination by an XRF detector of the amount of metal in the exploration sample;

associating the collector device having the dissolved metal adsorbed thereon with an XRF detector; and, measuring a concentration of adsorbed metal on the collector device with the XRF detector.

The present disclosure also provides a digestion composition as described above for use with a method or a system of analysing an exploration sample containing a metal at concentrations not directly detectable by XRF.

In another aspect, the present disclosure also provides a digestion tablet as described above for use with a method or a system of analysing an exploration sample containing a metal at concentrations not directly detectable by XRF.

Other features, objects and advantages of the present disclosure and its embodiments will become apparent from the detailed description, examples and claims that follow.

BRIEF DESCRIPTION OF DRAWINGS

Preferred embodiments of the present invention will now be further described and illustrated, by way of example only, with reference to the accompanying drawings in which.

DESCRIPTION OF EMBODIMENTS

Figure 1:
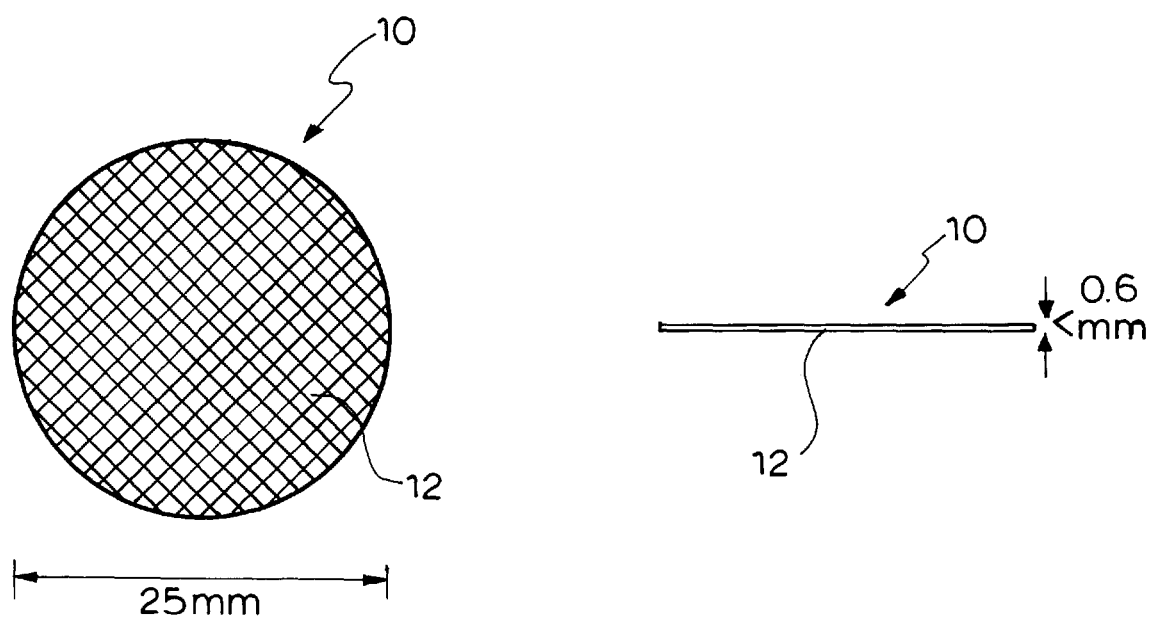
FIG. 1 provides a schematic representation of a collector device according to one embodiment described herein.

The present invention is described in the following various non-limiting embodiments, which relate to systems and methods for preparation and analysis of samples containing metal at concentrations not directly detectable by XRF. Various non-limiting embodiments relating to digestion compositions and digestion tablets which can be used in said systems and methods to dissolve a metal from a sample containing metal at concentrations not directly detectable by XRF are also described. Further, a collector device which can be used in said systems and methods to concentrate the dissolved metal is also described.

General Terms

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or groups of compositions of matter. Thus, as used herein, the singular forms "a", "an" and "the" include plural aspects unless the context clearly dictates otherwise. For example, reference to "a" includes a single as well as two or more; reference to "an" includes a single as well as two or more; reference to "the" includes a single as well as two or more and so forth.

Each example of the present disclosure described herein is to be applied *mutatis mutandis* to each and every other example unless specifically stated otherwise. The present disclosure is not to be limited in scope by the specific examples described herein, which are intended for the purpose of exemplification only. Functionally-equivalent products, compositions and methods are clearly within the scope of the disclosure as described herein.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be clearly understood that, although a number of prior art references are made herein, this reference does not constitute an admission that any of this information forms part of the common general knowledge in the art, in Australia or in any other country.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

Specific Terms

The term "low-level metal analysis" as used herein refers to detection, identification and/or measurement of a concentration of a metal n an exploration sample containing the metal, wherein the concentration of the metal in the exploration sample may be from 5 ppb to 10 ppm. In the embodiments described herein, the detection, identification and/or measurement of the concentration of the metal in the exploration sample may be performed with an X-ray fluorescence (XRF) detector, in particular a portable XRF (pXRF) detector.

The term "sample" refers to a geological sample. The sample may include, but is not limited to, an ore, mineral, concentrate, tailings, soil, drill cutting, stream sediment or alluvial sediments. Samples may be collected from one or more sites in accordance with field sampling for a mineral exploration campaign, as will be known to those skilled in the art. The field sampling or mineral exploration campaign will determine the sample size, size fraction, site selection, sample density, sample interval and so forth. The field sampling campaign may be modified in response to results obtained by the methods described herein; this may be called 'interactive sampling'.

A minimum sample size may be a function of the metal abundance and the particle-size distribution. Larger samples are generally required for coarse metal particles than for fine metal particles, in particular when the metal is gold. For large particles, for example, only one sample in ten equal samples may be expected to contain gold and that fraction may report a value of ten times the average value of the sample. An equal weight of fine-grained gold would more likely report in each fraction at about a common concentration. For the purposes of the embodiments described herein, the sample may be about 250-500 g. Advantageously, preparation and analysis of the sample in this weight range in accordance with the methods described herein increases the analytical precision in samples containing coarse gold particles.

The term "metal lixiviant" as used herein refers to one or more chemical compounds capable of selectively dissolving a desired metal or metalloid from a sample into a liquid medium. The dissolved metal or metalloid may then be recovered from the liquid medium in a concentrated form. The metal lixiviant may selectively dissolve the metal or metalloid by altering the redox state of the sample or the pH of the liquid medium. A reference to 'dissolved metal' or 'adsorbed metal' or variants thereof throughout this specification will be understood to also encompass a 'dissolved metalloid' or an 'adsorbed metalloid', respectively.

The term "digestion medium" as used herein refers to a liquid medium capable of dissolving the metal lixiviant, one or more compounds other than the metal lixiviant for adjusting and/or maintaining the liquid medium under a desired condition (e.g. pH, ionic strength, reduction potential (Eh), dissolved oxygen and so forth), and the metal in the sample.

The digestion medium may be an aqueous solvent, such as water. The water may be rainwater, deionised water, distilled water, ultrapure water, municipal water, groundwater, produced water, process water, brackish water, or brine.

Digestion Composition

The present disclosure provides a digestion composition which may be used to prepare an exploration sample for low-level metal analysis, in particular for low-level gold analysis, in accordance with methods described herein.

The digestion composition comprises a metal lixiviant and an alkali compound. The metal lixiviant may be a compound capable of dissolving a metal or metalloid of interest in the exploration sample.

In one embodiment the metal lixiviant may be a cyanide compound. The cyanide compound may be a water soluble cyanide salt such as sodium cyanide, calcium cyanide, lithium cyanide or potassium cyanide.

Alternatively, the metal lixiviant may be a thiosulphate compound in particular a water soluble thiosulphate salt, such as ammonium thiosulphate.

Alternatively, the metal lixiviant may be an iodide compound, in particular a water soluble iodide salt, such as ammonium iodide or sodium iodide.

In acidic environments, cyanide salts may generate toxic hydrogen cyanide (HCN). Some samples may have a high sulphide content and/or a low buffering carbonate content. Such samples, when mixed with the digestion medium may lower the pH of the digestion mixture thereby providing conditions under which hydrogen cyanide may be generated. Accordingly, the alkali compound may be present in the digestion composition in an amount sufficient to maintain the pH of the digestion mixture above 7, preferably to maintain the pH of the digestion mixture above 10.

The alkali compound may be an alkali metal hydroxide, an alkaline earth metal hydroxide, lime (CaO), soda ($Na_2O$), or a combination of two or more.

In use, a fixed amount of the digestion composition and the sample are mixed with a digestion medium, such as water, to produce a digestion mixture. The metal lixiviant is present in the digestion composition in an amount sufficient to leach the metal in the sample into the digestion mixture. In one embodiment, the metal lixiviant is present in the digestion composition in an amount sufficient to provide a concentration in the digestion mixture of between 1 ppm and 10000 ppm. It will be appreciated that a high cyanide concentration in the digestion mixture may require extended treatment to neutralise the cyanide for disposal.

The digestion composition may also comprise an accelerant selected from a group comprising: an alkali or alkali earth metal peroxide, an alkali or alkali earth metal percarbonate, an organic peroxide, or an organic percarbonate, or metal ions such as copper or lead or another ion that does not interfere with the analysis.

In some embodiments, the digestion composition may further comprise a pH indicator compound, for example a compound that is a distinct colour below or above a specific pH. The pH indicator compound may be included in the digestion composition to indicate if the digestion medium or digestion mixture falls below a pH at which hydrogen cyanide gas forms.

For ease of use, the fixed amount of the digestion composition may be pre-measured and packaged into a sachet. The sachet may then be opened and the fixed amount of the digestion composition may be readily dispensed into a sample preparation vessel for preparing a sample for analysis as described herein.

In an alternative embodiment, the fixed amount of the digestion composition may be pre-measured and packaged into a frangible pouch or capsule associated with a closure of a sample preparation vessel, wherein the closure is configured to break or tear the frangible pouch or capsule when the closure closes the sample preparation vessel, thereby releasing the digestion composition into said vessel.

In a further alternative embodiment, the fixed amount of the digestion composition may be pre-measured and packaged in the sample preparation vessel.

The digestion composition may further comprise one or more compounds other than the metal lixiviant and the alkali compound for adjusting and/or maintaining the liquid medium under a desired condition (e.g. pH, ionic strength, oxygen concentration, reduction potential (Eh) and so forth). For example, the digestion composition may further comprise an ionic salt in an amount sufficient to maintain an ionic strength of the digestion mixture to at least 0.1M. Suitable examples of ionic salts for this purpose include, but are not limited to sodium chloride, etc.

Digestion Tablet

The fixed amount of the digestion composition may be conveniently provided in the form of a digestion tablet which may be used to prepare a sample for low-level metal analysis, in particular for low-level gold analysis, in accordance with methods described herein.

Figure 9A:
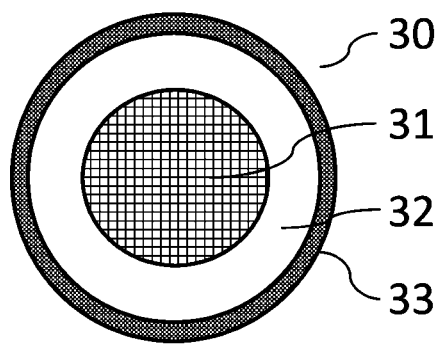
FIGS. 9A and 9B are graphical representations of digestion tablet according to embodiments described herein.
Figure 9B:
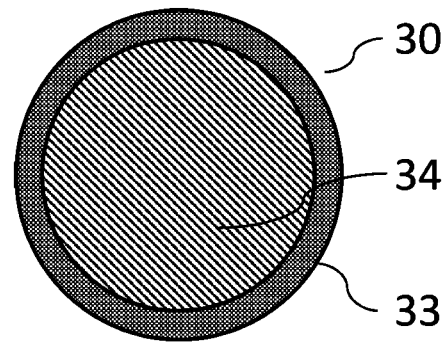

In one embodiment shown in FIG. 9B, the digestion tablet (30) may comprise a core portion (34) as described above containing a mixture of a metal lixiviant and an alkali compound and an overcoat layer (33) comprising a water soluble or water dispersible polymer.

In an alternative embodiment shown in FIG. 9A, the digestion tablet (30) may comprise a core portion (31) containing the metal lixiviant, a layer (32) of alkali compound encompassing the core portion (31), and an overcoat layer (33) comprising a water soluble or water dispersible polymer. The layer of alkali compound may also comprise an accelerant and/or a pH indicator compound.

The overcoat layer allows the digestion tablet to be safely handled because it reduces the risk of contact contamination of personnel with the metal lixiviant, in particular in embodiments where the metal lixiviant is a cyanide salt such as sodium cyanide or potassium cyanide.

Many water-soluble or water-dispersible polymers are known in the prior art that may serve the present purposes. By way of illustrating the water-soluble or water-dispersible polymers that may be employed herein, mention may be made of the following: hydroxypropylmethylcellulose, polyvinyl pyrrolidone, hydroxypropyl cellulose, polyethylene glycol 3350, 4500, 8000, methyl cellulose, pseudo ethylcellulose. One such polymer that has been found to be very suitable is hydroxypropyl methylcellulose which is a propylene glycol ether of methylcellulose. This is available from several manufacturers as for example from Dow under the trade names HPM Cellulose.

Aside from the water-soluble or water-dispersible polymers, the overcoat layer may also contain other additives which may aid in the application of the coating to the tablet or to improve the character of the coating. These may be such additives as surfactants, plasticisers, antifoaming agents, solubilising agents, colouring agents.

The digestion tablet as described herein can be prepared by any known techniques like direct compression, wet granulation, dry granulation, spray drying and solid dispersion.

The overcoat layer as described herein can be prepared by any known techniques like dip coating, compression coating, film coating including organic film coating and vacuum film coating.

In an alternative embodiment, the digestion tablet may take the form of a capsule, wherein the digestion composition as described above may be encapsulated in a water soluble or water dispersible polymeric capsule, such as a gelatin capsule.

Collector Device for Determining a Concentration of Metal in an Exploration Sample not Directly Detectable by XRF The present disclosure also provides a collector device for determining a concentration of a metal in an exploration sample containing a metal or metalloid not directly detectable by XRF. The collector device is adapted to adsorb and concentrate dissolved metal from a digestion mixture produced by digesting the exploration sample. The collector device is configured for association with an analysis window of the XRF detector to measure the amount of dissolved metal adsorbed on the collector device. The detector may be an XRF detector, in particular a pXRF detector.

The expression 'a concentration of the metal not directly detectable by XRF' and variants thereof refers to a concentration of metal or metalloid in the exploration sample which is below the detectable threshold for the XRF detector.

The term "detectable threshold" as used herein refers to the lowest concentration of a specific metal (e.g. gold) that can be consistently detected by a pXRF detector. It will be appreciated that the detectable threshold will vary according to the specific metal, the type of detector, the substrate on which the specific metal is adsorbed or the solvent in which the specific metal is dissolved, the nature and concentration of contaminants, the nature and concentration of elements that provide spectral interferences (e.g. arsenic, tungsten, and zinc in the case of gold), and so forth. The detectable threshold of the specific metal for the detector may be determined by techniques known to those skilled in the art The collector device comprises an adsorbent material capable of adsorbing dissolved metal from the digestion mixture, thereby concentrating the dissolved metal from the digestion mixture. The concentration of metal or metalloid in the exploration sample may be a low concentration (e.g. 1 ppb to 1 ppm), in which case it is not possible to directly measure the concentration of the metal or metalloid in the sample with XRF techniques because the concentration of metal or metalloid in the sample is below a detectable threshold. It will be appreciated that the normal 'detectable' threshold may vary between individual XRF detectors and samples but will typically be from 1 ppm to 10 ppm depending on the matrix of the sample. Advantageously, adsorbing the dissolved metal from the digestion mixture onto the collector device concentrates the dissolved metal to a concentration at or above the detectable threshold for the metal.

In one embodiment, wherein the metal is gold and the detector is a pXRF detector, the normal detectable threshold for the pXRF detector may be greater than 1 ppm gold.

The collector device may be configured for association with an analysis window of an XRF detector, in particular a pXRF detector. The expressions 'configured for association with' and 'configured for association with an analysis window of the XRF detector', as used herein, refer to the collector device being shaped and sized to entirely cover the analysis window of the XRF detector.

The collector device may comprise an adsorbent material, in particular a textile material. Preferably, the textile material is capable of chemically adsorbing the dissolved metal. The textile material may be a randomly or non-randomly arranged fibrous mesh, woven, braided, or felt-like textile material. In one form the textile material may be an activated carbon cloth. Activated carbon cloth is particularly effective at adsorbing gold cyanide.

Tungsten and/or arsenic are pathfinders that are typically associated with samples containing gold, generally in much higher concentration than gold. Tungsten and arsenic are also elements that may cause overlapping spectral interferences for analysis of gold by XRF techniques. Accordingly, the presence of tungsten and/or arsenic in an exploration sample containing gold make direct gold analysis by XRF of limited use. Therefore, XRF analysis for gold in exploration samples containing tungsten and/or arsenic is not practical. Advantageously, tungsten and arsenic in the sample are poorly dissolved in the digestion mixture and furthermore are only adsorbed onto the activated carbon cloth at very low (i.e. non-interfering) concentrations.

The collector device may further comprise a permeable housing for the adsorbent material. The permeable housing allows the passage of liquid therethrough but minimises (1) particulate material in the digestion mixture from abrading adsorbed metal from the plate of adsorbent material and (2) particulate material from clogging the pores of the adsorbent material.

In one embodiment, the permeable housing may be <40 μm mesh. For example, the permeable housing may be a sealed mesh envelope containing the plate of adsorbent material. It will be appreciated that the collector device may be retrievable from the permeable housing prior to association with the detector. For example, the permeable housing may be temporarily sealed around the collector device and then cut or torn open after the collector device has been contacted with the digestion mixture to release the plate of adsorbent material, prior to analysis by the XRF detector.

It will be appreciated that the permeable housing may be fabricated from a material which is inert to the digestion composition and non-adsorbent to the metal of interest.

The collector device may be fabricated by any suitable technique. A consistency in the shape and size of the collector device is desirable as it enhances overall precision and accuracy of the measurement of dissolved metal from a plurality of exploration samples by the XRF detector.

One or more reference standard devices may also be fabricated and used in association with the methods and systems described herein. The reference standard device may comprise a plate of adsorbent material having a known amount of metal adsorbed thereon, wherein the plate is configured for association with an XRF detector arranged to detect the known amount of metal. It will be appreciated by those skilled in the art that the reference standard device must be fabricated from an identical adsorbent material, and be shaped and sized in an identical manner, to the collector device for which it is intended to be employed as a reference standard, thereby eliminating matrix effects that would interfere with the analysis.

In use, a plurality of reference standard devices, each having a different known amount of metal adsorbed thereon, may be used to establish a calibration curve to allow determination of a concentration of metal in a sample after analysis by the methods and systems described herein. The calibration curve may be established by suitable analytical techniques corresponding to the XRF detector and the specific metal, as will be understood by those skilled in the art.

Figure 2A:
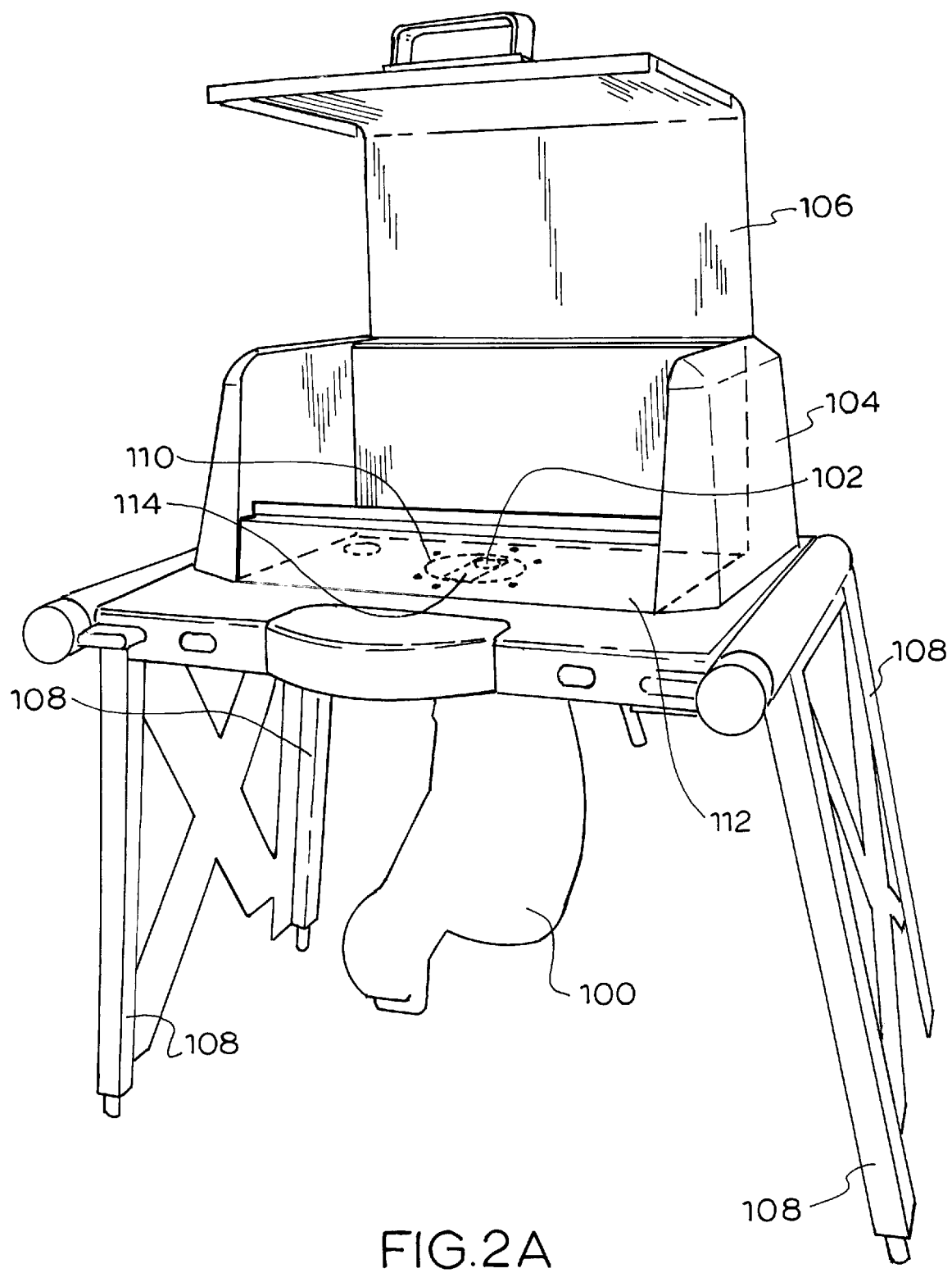
FIGS. 2A and 2B provide schematic representations of the collector device shown in FIG. 1 in association with an analysis window of a pXRF detector.
Figure 2B:
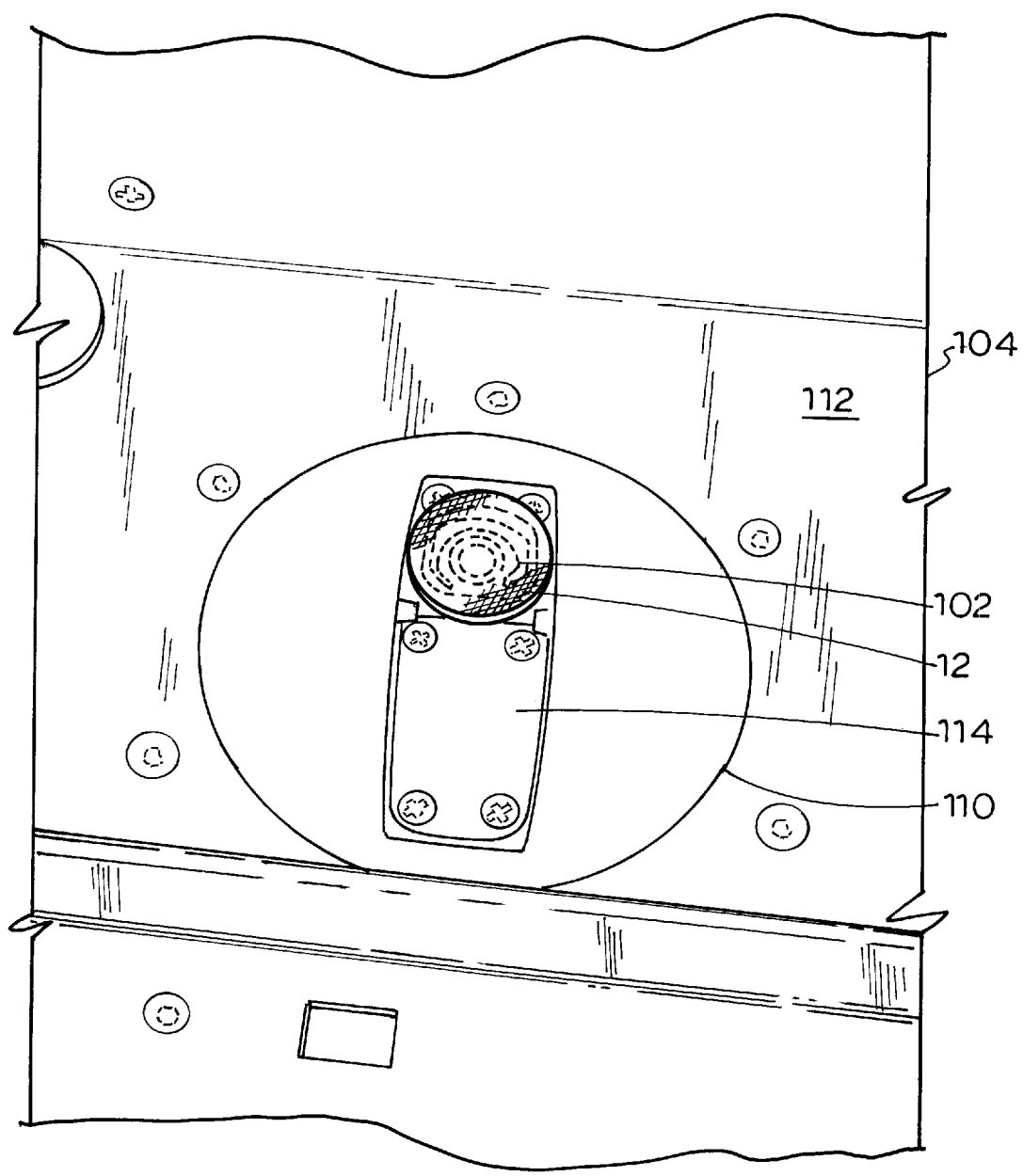

Referring to FIGS. 1 and 2, a collector device (10) comprising a disc (12) of activated carbon cloth is shown. The disc (12) is circular-shaped and sized so as to entirely cover an analysis window (102) of a pXRF detector (100) as shown in FIG. 2.

Although the pXRF detector may be handled manually in the field, in this embodiment, a shielded chamber (104) may be provided for operative association with the pXRF detector (100). The shielded chamber (104) has a door (106) hingedly positionable between an open configuration (as shown) and a closed configuration to shield an operator from X-ray emissions from the pXRF detector (100) during operation. The shielded chamber (104) may be provided with a plurality of legs (108) to elevate the shielded chamber (104) above a benchtop surface. The shielded chamber (104) may also be provided with an aperture (110) in a base wall (112) thereof, wherein the aperture (110) is configured to receive a leading face (114) of the pXRF detector (100) in a close-fitting relationship. In use, the pXRF detector (100) is disposed in a gap between the benchtop surface and the base wall (112) of the shielded chamber (104) whereby the leading face (114) of the pXRF detector (100) is received in the aperture (110) and is disposed in lateral alignment with the base wall (112) of the shielded chamber (104).

The analysis window (102) of the pXRF detector (100) is disposed in the leading face (114) of the pXRF detector (100). In use, a sample for analysis is disposed with respect to the analysis window (102) in an arrangement whereby the sample interacts with X-ray radiation emitted from the analysis window (102) and X-ray fluorescence emitted by the sample is detected through the analysis window (102).

In this particular embodiment, as shown in FIG. 2A, the collector device (10) is associated with the analysis window (102) by placing the collector device (10) on the analysis window (102) to entirely cover the analysis window (102).

In an alternative embodiment, the collector device (10) may comprise a bed of adsorbent material, such as activated carbon granules or anion exchange resin beads. The bed may be configured for association with the analysis window (102) of the pXRF detector (100). For example, the bed may be contained in a vessel having an interior space which defines the bed of adsorbent material. It will be appreciated that the bed of adsorbent material will have a consistent depth throughout.

In this particular embodiment, the vessel may be configured to allow X-ray radiation to interact with the bed of adsorbent material. For example, the vessel may be provided with a base wall (112) or a closure that is at least near-transparent to X-ray radiation. The vessel containing the bed of adsorbent material may be positioned with respect to the analysis window (102) of the pXRF detector (100) so that the transparent base wall or closure abuts and/or covers the analysis window (102) of the pXRF detector (100).

In use, a fixed amount of the activated carbon granules or the anion exchange resin beads may be contained within a mesh envelope. After adsorbing the metal thereon, the contents of the mesh envelope may be washed and a bed of said activated carbon granules or anion exchange resin beads may be laid flat on the analysis window (102) of the pXRF detector (100).

Alternatively, the activated carbon granules or anion exchange resin beads may be poured into a vessel having an interior space which defines the bed of adsorbent material. In this particular embodiment, the vessel may be configured to allow X-ray radiation to interact with the bed of adsorbent material formed therein. For example, the vessel may have a base fabricated from a material that is near-transparent to X-ray radiation. The base of the vessel may be placed on the analysis window (102) of the pXRF detector (100) to facilitate measurement of the dissolved metal adsorbed on the bed of activated carbon granules or anion exchange resin beads.

Sample Preparation Vessel

The present disclosure also provides a sample preparation vessel for preparing a sample containing low-level metal for analysis by a pXRF detector (100).

Figure 3A:
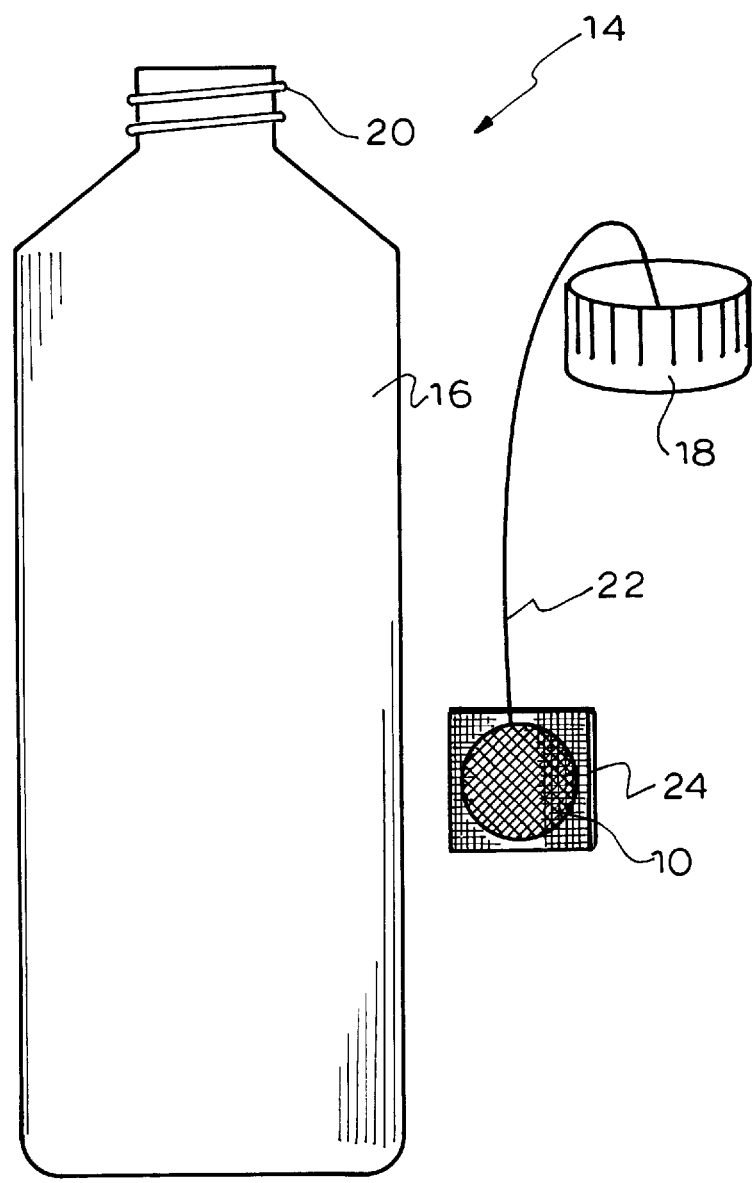
FIGS. 3A and 3B provide a schematic representation of a sample preparation vessel according to one embodiment described herein.
Figure 3B:
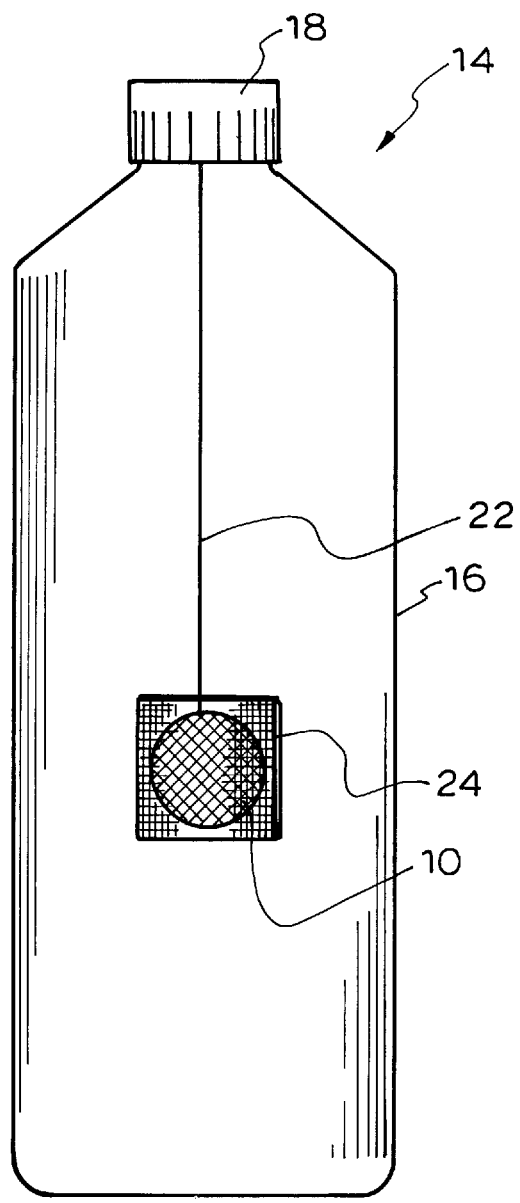

Referring to FIGS. 3A and 3B, the sample preparation vessel (14) may include a vessel (16) for receiving an exploration sample containing a metal, a fixed amount of a digestion composition or a digestion tablet, and a digestion medium. Preferably, the vessel (16) is fabricated from a material that is inert to reaction with the exploration sample, digestion composition or digestion tablet and the digestion medium. Suitable materials may include, but are not limited to, glass or plastics materials commonly used in analytical laboratories, as will be well known to those skilled in the art. Generally, these materials will be rigid.

In alternative embodiments (not shown), the vessel (16) may be fabricated from a flexible material, such as a plastics material used for the production of food or beverage storage pouches or bags. Such "bladder-like" vessels may be convenient in a remote location, as they can be stored and transported flat and occupy less space than conventional rigid plastic bottles.

The vessel (16) is provided with a closure (18) to allow the vessel (16) to be closed and its contents to be agitated without spillage. The vessel (16) and the closure (18) may be complementary to one another. For example, a neck (20) of the vessel (16) and the closure (18) may be provided with complementary threading so that the closure (18) may be screwed on and off the neck (20) of the vessel (16). In alternative embodiments (not shown), the closure (18) may be configured to be either snap-fitted over the neck (20) of the vessel (06) or bunged into the neck (20) of the vessel (16). Other suitable complementary arrangements will be apparent to the skilled person in the art.

The sample preparation vessel (14) also includes the collector device (10) as described previously. It will be appreciated that the neck (20) of the vessel (16) will be shaped and sized to allow the collector device (10) to be readily inserted and retrieved from the vessel (16).

The closure (18) and the collector device (10) may be coupled in a manner whereby the collector device (10) may be conveniently retrieved from the vessel (16) by removing the closure (18) therefrom. For example, the closure (18) and the collector device (10) may be coupled by an elongate element (22). The elongate element (22) may be fabricated from a material that is inert to reaction with the exploration sample, digestion composition or digestion tablet, and the digestion medium.

The elongate element (22) may be flexible. For example, the elongate element (22) may be a plastic cable, wire or thread fabricated from nylon or polyethylene or any other plastics material that is commonly used in analytical laboratories.

In this particular embodiment, the collector device (10) is housed in a protective covering or permeable housing (24), such as a sealed mesh envelope as previously described.

In alternative embodiments (not shown), the elongate element (22) may be rigid. For example, the elongate element (22) may be provided with a permeable housing for the collector device (10).

In other embodiments, the closure (18) and a permeable housing of the collector device (10) may be coupled in a manner whereby the collector device (10) and the permeable housing may be conveniently retrieved from the vessel (16) by removing the closure (18) therefrom.

In still further embodiments, the permeable housing containing the collector device (10) may not be coupled to the closure (18) by the elongate element (22). In these particular embodiments, the collector device (10) and the permeable housing may be retrieved from the vessel (16) by pouring out the contents from the vessel (16).

Method and System for Preparing a Sample

The present disclosure also provides a method and a system for preparing an exploration sample containing metal or metalloid not directly detectable by XRF for analysis by an XRF detector.

The method for preparing an exploration sample for analysis by an pXRF detector (100) comprises:

mixing the exploration sample, an alkali compound and a metal lixiviant in an amount capable of dissolving the metal or metalloid from said sample in a digestion medium to produce a digestion mixture; and, contacting the digestion mixture with a collector device (10) comprising an adsorbent material capable of concentrating dissolved metal from the digestion mixture, wherein the adsorbent material is configured for association with an analysis window (102) of the pXRF detector (100) to facilitate determination by an XRF detector of the amount of metal in the exploration sample.

In some embodiments, the dissolved metal in the digestion mixture is concentrated by adsorption on the collector device (10) to a concentration at or above a detectable threshold of a pXRF detector (100).

The exploration samples that are prepared by the methods as described herein may be 'as-received' or may undergo comminution by one or more crushing, grinding and milling processes prior to being prepared for analysis. The exploration sample may undergo classification to select a fraction having a particle size <250 microns, or even a fraction having a particle size <75 micron.

It will be appreciated that a desired particle size may be selected with regard to the nature and type of exploration sample. Even though a particular size fraction of the sample may have the highest gold concentrations, it may well be that another particle size fraction of the sample generates more consistent and meaningful data with the analysis methods described herein. The desired particle size for the exploration sample may be determined by experimental techniques by "interactive sampling" or by orientation work as will be well understood by those skilled in the art.

In one embodiment, the alkali compound and the metal lixiviant may be provided in a fixed amount of the digestion composition as previously described.

In another embodiment, the alkali compound and the metal lixiviant may be provided as a digestion tablet as previously described.

In one embodiment, the metal lixiviant is present in an amount sufficient to provide a concentration in the digestion mixture of from 1 ppm, to 10000 ppm. The amount of alkali compound is sufficient to maintain pH>7 in the digestion mixture.

The collector device (10) may be as previously described. In some embodiments, the collector device (10) may be pretreated to optimise the surface for adsorbing metal in the digestion mixture.

The mixing step and the contacting step may be performed simultaneously.

The mixing step and the contacting step may be performed over a period of about 12-24 hours. It will be appreciated that the period may be shortened by increasing the temperature of the digestion mixture above ambient temperature or by increasing the concentration of metal lixiviant in the digestion mixture. In locations with ambient temperature <10° C., it may be necessary in practice to take suitable measures to ensure that the temperature of the digestion mixture is maintained at a temperature ≥15° C.

The mixing step and the contacting step may be performed by agitating the collector device, the exploration sample, the alkali compound, the metal lixiviant and the digestion medium in a container, such as a vessel (16). The vessel (16) may be agitated to mix its contents. The vessel (16) may be closed so that the vessel (16) may be agitated without spillage of its contents. The vessel (16) may be agitated by any one of several conventional techniques such as rolling, shaking, spinning. Alternatively, the contents of the container may be agitated by mechanically stirring the contents.

After completion of the mixing and contacting steps, the collector device (10) with the adsorbed metal thereon (and, optionally the permeable housing) may be retrieved from the container, rinsed with water to remove any residual sample particulate materials, then air-dried.

In embodiments where the metal lixiviant is a cyanide salt, the digestion mixture remaining in the container must be neutralised prior to disposal to reduce the potential hazard for generation of toxic hydrogen cyanide gas or cyanide in solution which may be toxic to organisms. A stoichiometric excess of an oxidising agent such as potassium permanganate ($KMnO_4$) (Condy's crystals) or chlorine dioxide (e.g. in the form of swimming pool tablets or household liquid bleach) may be used to oxidise the cyanide into less toxic reaction products (e.g. manganese dioxide, nitrogen gas, carbon dioxide and potassium hydroxide). The neutralised solution may then be disposed without harm to the environment or personnel.

Various embodiments of the above method may be performed by using a system for preparing a sample containing a metal or metalloid not directly detectable by XRF detector for analysis by a detector, such as an XRF, in particular a pXRF detector (100).

Said system comprises a digestion composition or a digestion tablet containing an alkali compound and a metal lixiviant in an amount capable of dissolving the metal or metalloid from said sample in a digestion medium. The digestion composition as previously described may be provided in a fixed amount (or multiples thereof).

The system may also comprise a vessel (16) for receiving the exploration sample, the digestion composition or the digestion tablet, and the digestion medium. In one embodiment, the vessel (16) has a closure (18) to allow the vessel (16) to be agitated without spillage of its contents and thereby produce a digestion mixture comprising said sample and the digestion composition or the digestion tablet dissolved in the digestion medium.

The vessel (16) and the closure (18) may be as previously described.

The system may also comprise a collector device (10) for determining a metal in an exploration sample containing a metal or metalloid not directly detectable by XRF. The collector device (10) comprises an adsorbent material capable of concentrating dissolved metal from a digestion mixture produced by digesting the exploration sample, wherein the adsorbent material is configured for association with an analysis window (102) of the pXRF detector (100) to facilitate determination by the pXRF detector (100) of the amount of metal or metalloid dissolved from the exploration sample.

In one embodiment, the collector device (10) may be as previously described. The collector device (10) may be coupled to the closure (18) by an elongate element (22) as previously described to assist retrieval of the collector device (10) after sample preparation.

Method and System for Analysis

The present disclosure also provides a method and system for analysis of an exploration sample containing a metal or metalloid not directly detectable by XRF.

The method of analysing an exploration sample containing a metal or metalloid not directly detectable by XRF comprises the steps of:

providing a digestion mixture comprising said sample and a digestion composition or a digestion tablet containing an alkali compound and a metal lixiviant in an amount capable of dissolving the metal or metalloid from said sample in a digestion medium;

contacting the digestion mixture with a collector device comprising an adsorbent material capable of concentrating dissolved metal value from the digestion mixture, wherein the adsorbent material is configured for association with an analysis window of the XRF detector to facilitate determination by an XRF detector of the amount of metal in the exploration sample;

associating the collector device having the dissolved metal adsorbed thereon with the XRF detector; and, measuring a concentration of adsorbed metal on the collector device with the XRF detector.

The digestion mixture may be prepared as previously described. Similarly, the step of contacting the digestion mixture with the collector device may be performed as previously described.

Associating the collector device with the XRF detector comprises placing the collector device on the analysis window of the XRF detector. It will be appreciated from the foregoing discussion that the collector device is shaped and sized to entirely cover the detection window of the XRF detector.

Measuring the concentration of adsorbed metal on the collector device comprises operating the XRF detector according to the manufacturer's instructions. Determination of the amount of metal may be achieved by reference to an established calibration curve specific to the metal and to the XRF detector which have been determined using a plurality of reference standard devices for varying concentrations of the metal as has been previously described.

After measuring the concentration of the adsorbed metal, the collector device may be disposed of or destroyed. Although the concentration of the adsorbed metal on the collector device is concentrated to above a detectable threshold of the XRF detector, the amount of adsorbed metal is insufficient to perform any process to recover the adsorbed metal. Alternatively, the 'used' collector devices may be stored and archived in a 'library' so that they can be subsequently retrieved and analysed multiple times. This may be advantageous for cross-checking purposes and/or for developing an elemental 'fingerprint' of exploration samples from a particular deposit or region.

The system for metal analysis of an exploration sample containing a metal or metalloid not directly detectable by XRF comprises:

a digestion composition or a digestion tablet containing an alkali compound and a metal lixiviant in an amount capable of dissolving the metal or metalloid from said sample in a digestion medium;

a collector device comprising an adsorbent material capable of concentrating dissolved metal from the digestion mixture, wherein the adsorbent material is configured for association with an analysis window of the XRF detector to facilitate determination by an XRF detector of the amount of metal in the exploration sample; and, an XRF detector arranged to detect the metal adsorbed on the collector device.

In one embodiment, the detector is a pXRF detector. An example of a commercially available pXRF detector that is suitable for performing the methods as described herein include, but are not limited to, the pXRF detector manufactured by Olympus (e.g. Olympus Innovx Delta Premium DP-6000-C).

In one embodiment the system further comprises a control device for controlling the detector. The control device may comprise a memory for storing data, interpreting concentrations and operation software, a controller that provides a user interface, and an external port for export of data.

A touch responsive display (not shown) may be provided to present information to an operator (for instance data representing the concentration of gold adsorbed on the collector device) and to accept operator input. The XRF analyzer will typically include a wired (for instance a USB) or a wireless communications port to enable the uploading and downloading of data, software, and other information to and from an external/remote computer.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

EXAMPLE

The invention is further illustrated by the following example. The example is provided for illustrative purposes only. It is not to be construed as limiting the scope or content of the invention in any way.

Geological exploration samples from a selection of sites were collected and brought back to a field base camp. The samples were sieved and 250-500 g of each sample having a particle size less than 250 micron was separated for sample preparation and analysis by pXRF detector.

The sample (250 g) and water (0.7L) were placed in a plastic bottle together with a digestion tablet as described previously A disc (25-26 mm diameter) of activated carbon cloth is also placed in the plastic bottle. One end of a length of plastic cable thread is attached to the protective mesh covering which contains the disc and the opposing end of the length of plastic cable thread is attached to a screw cap closure which threadably mates with the plastic bottle.

The screw cap closure is threaded onto the plastic bottle and then the plastic bottle is gently agitated using a powered rolling device for 24 hours at ambient temperature to mix the digestion tablet, the sample with the water thereby producing a digestion mixture, and to contact the digestion mixture with the disc of activated carbon cloth to adsorb the dissolved gold therefrom.

After 24 hours, the plastic bottle and its contents are removed from the rolling device and the screw cap closure is removed from the plastic bottle to retrieve the disc of activated carbon cloth with adsorbed gold.

The disc may be rinsed with water to remove any loose particulate material (e.g. particles of rock, clay, sand or soil), then air-dried and placed on the analysis window of the pXRF detector.

An XRF analysis for gold (and optionally other metals) is performed and the concentration of gold adsorbed on the disc of activated carbon cloth is reported. It will be appreciated that the measured concentration of gold adsorbed on the disc of activated carbon cloth is not an absolute measurement of the concentration of gold in the geological sample but rather it is directly proportional to the concentration of gold in the geological sample and the size of the disc.

After completion of the sample preparation as described above, the free cyanide remaining in the digestion mixture in the plastic bottle may be oxidised to remove a potential hazard of generating toxic hydrogen cyanide gas. A stoichiometric excess of an oxidising agent such as chlorine dioxide (e.g. in the form of swimming pool tablets or household liquid bleach) or potassium permanganate (Condy's crystals) oxidises the cyanide into less toxic reaction products (e.g. manganese dioxide, nitrogen gas, carbon dioxide and potassium hydroxide). The resulting solution may then be disposed without harm to the environment or personnel.

Figure 4A:
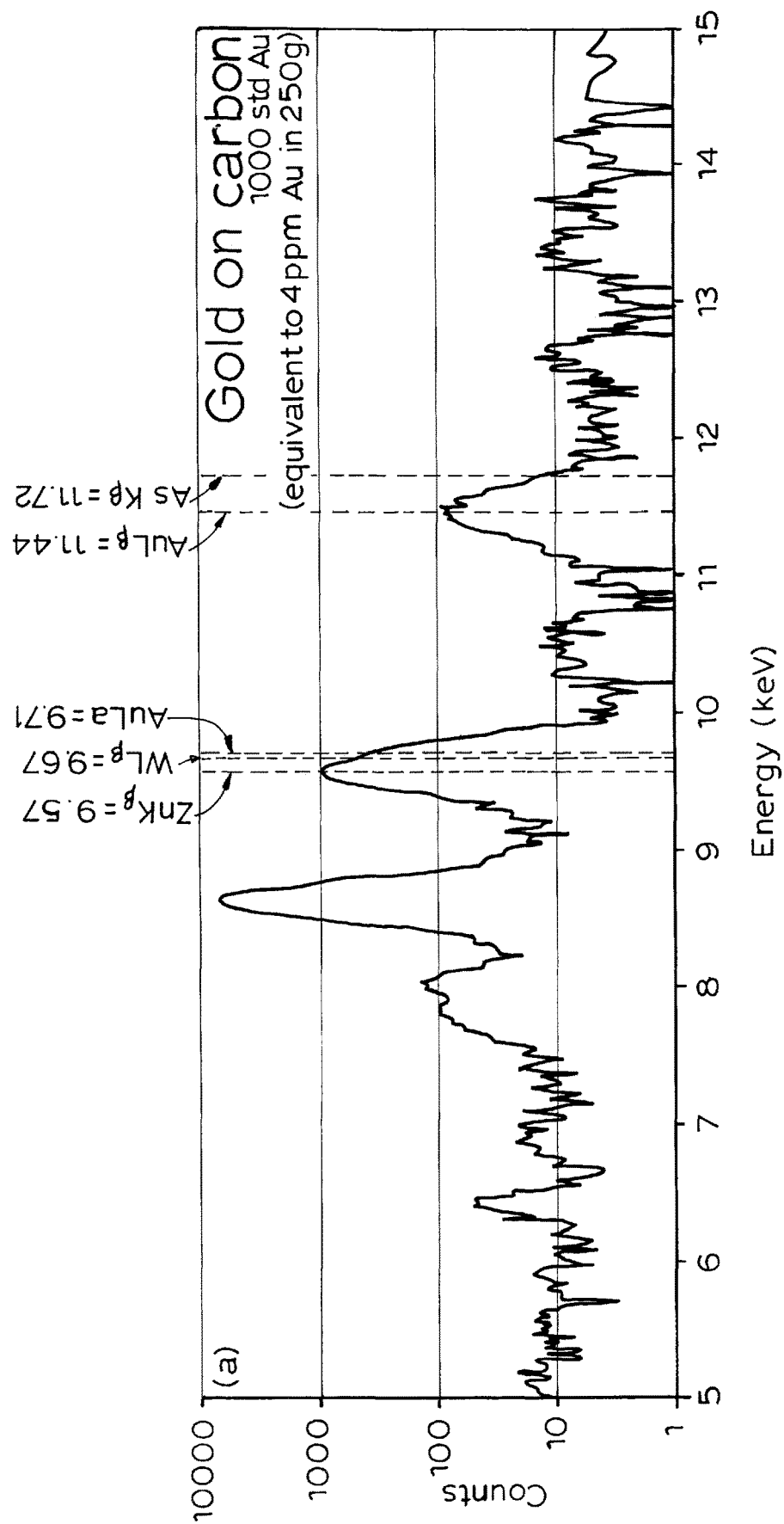
FIGS. 4A and 4B compare two respective XRF spectra for gold adsorbed on an activated carbon cloth in accordance with one embodiment as described herein; and a geological sample of As-rich gold ore containing about 30 ppm gold.
Figure 4B:
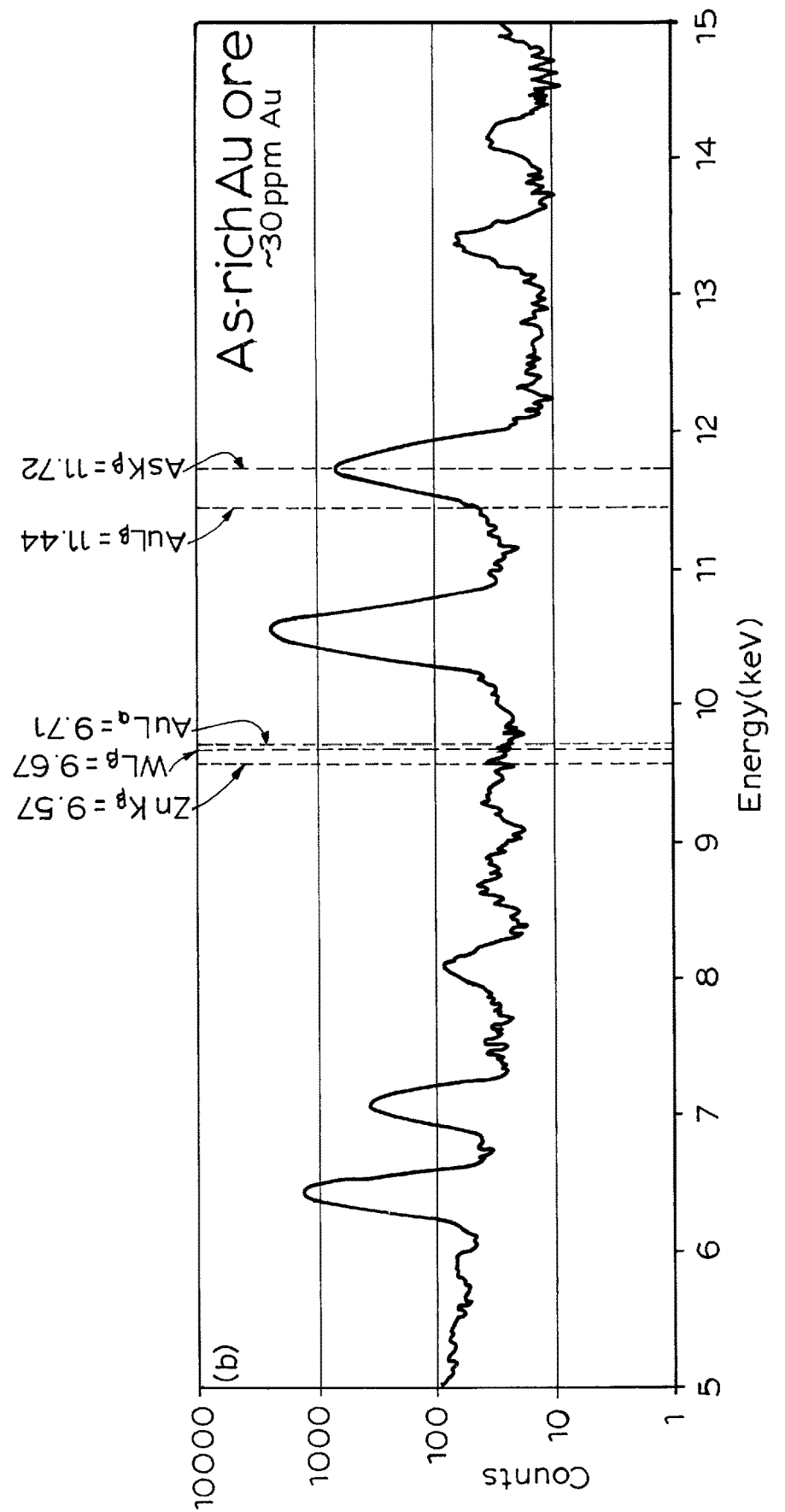

FIGS. 4A and 4B show respective XRF spectra for gold adsorbed on the metal collector device as described herein and an As-rich geological sample containing about 30 ppm gold. The spectrum shown in FIG. 4A is a spectrum (5-15 keV) of a carbon cloth 1000 standard containing gold adsorbed from 1 L of a 1 ppm solution (equivalent to 4 ppm Au in a 250 g sample), using a 40 kV, 4 W Rh-tube, Delta lnnov-X Olympus pXRF detector, location of relevant energy peaks as annotated. Note the close correspondence between the location of the Zn, W and gold peaks at 9.6 keV, and the gold and As peaks at ~11.5 keV. There is no As or W adsorbed on the collector device. Gold can be measured on its L-beta peak at 11.44 keV, but not its L-alpha peak at 9.71 keV due to the presence of Zn.

With respect to FIG. 4B, the As peak at ~11.7 keV interferes with the gold peak at ~11.4 keV; for this sample, gold may be measured on its L-alpha peak at 9.71 keV but this has spectral interferences from W and Zn which are typically present in gold-bearing exploration samples. Note that the deconvolution algorithms in this pXRF detector relies on region-of-interest methods to deconvolve the spectra and are not capable of switching peaks/regions to bypass potentially interfering elements present in the sample.

Figure 5:
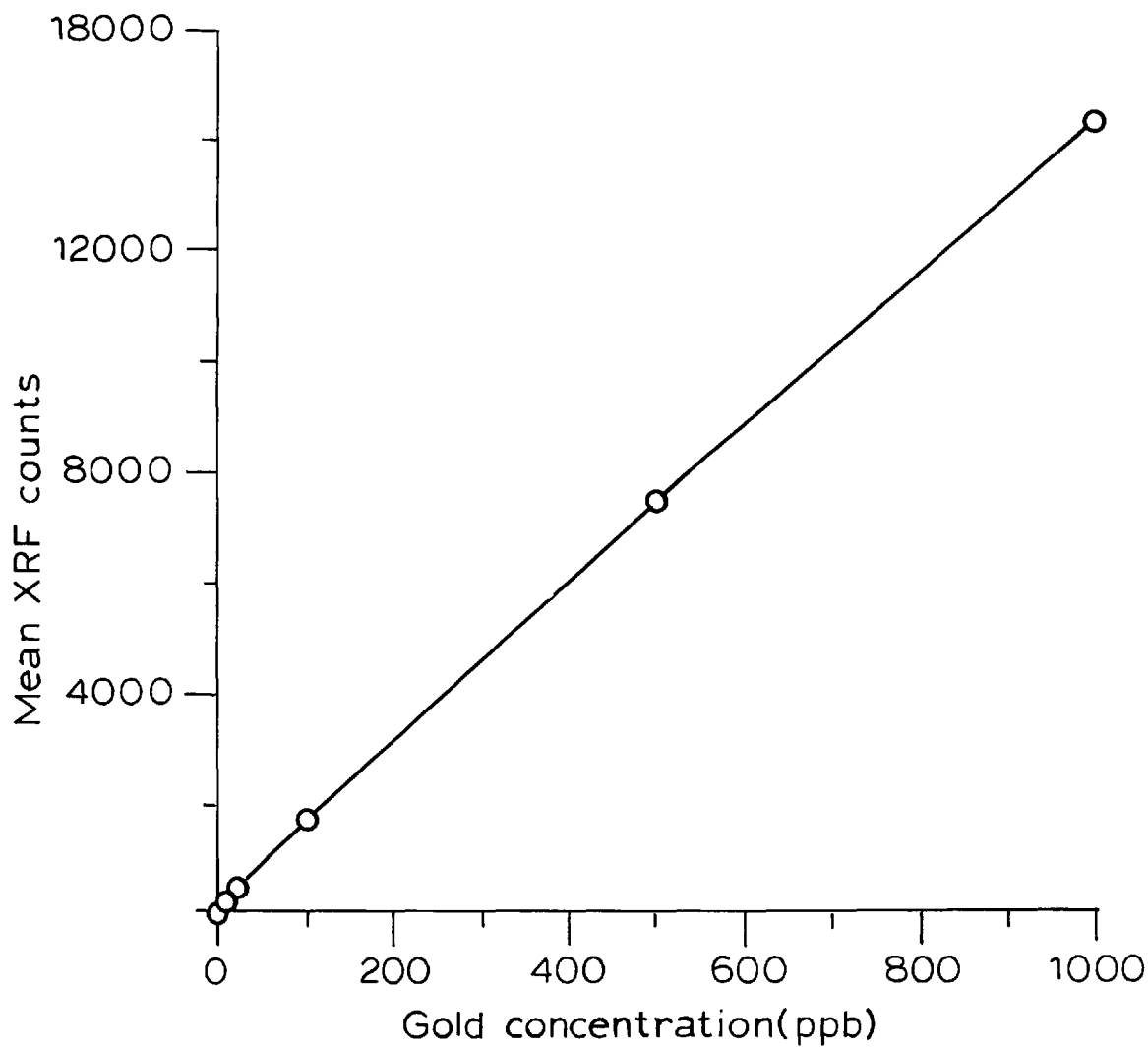
FIG. 5 shows a calibration curve for gold concentration (in parts per billion) vs pXRF counts.

FIG. 5 shows a calibration curve of concentration of gold (ppb) v pXRF counts from which gold concentrations in a sample may be calculated.

Figure 6:
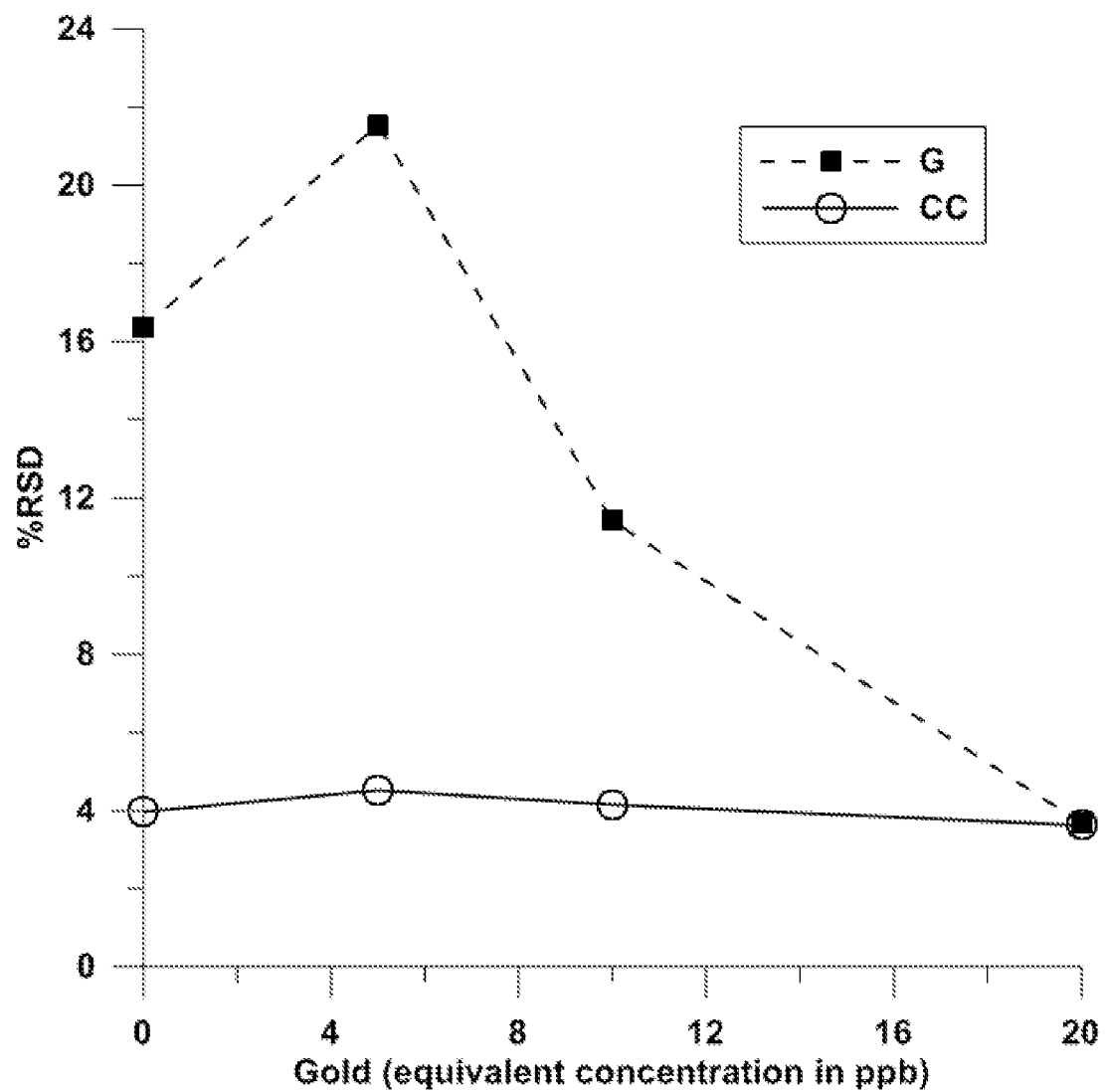
FIG. 6 is a graphical representation showing a measure of error in XRF measurements of gold at low concentrations adsorbed on carbon granules (G) in comparison with gold adsorbed on activated carbon cloth.
Figure 7:
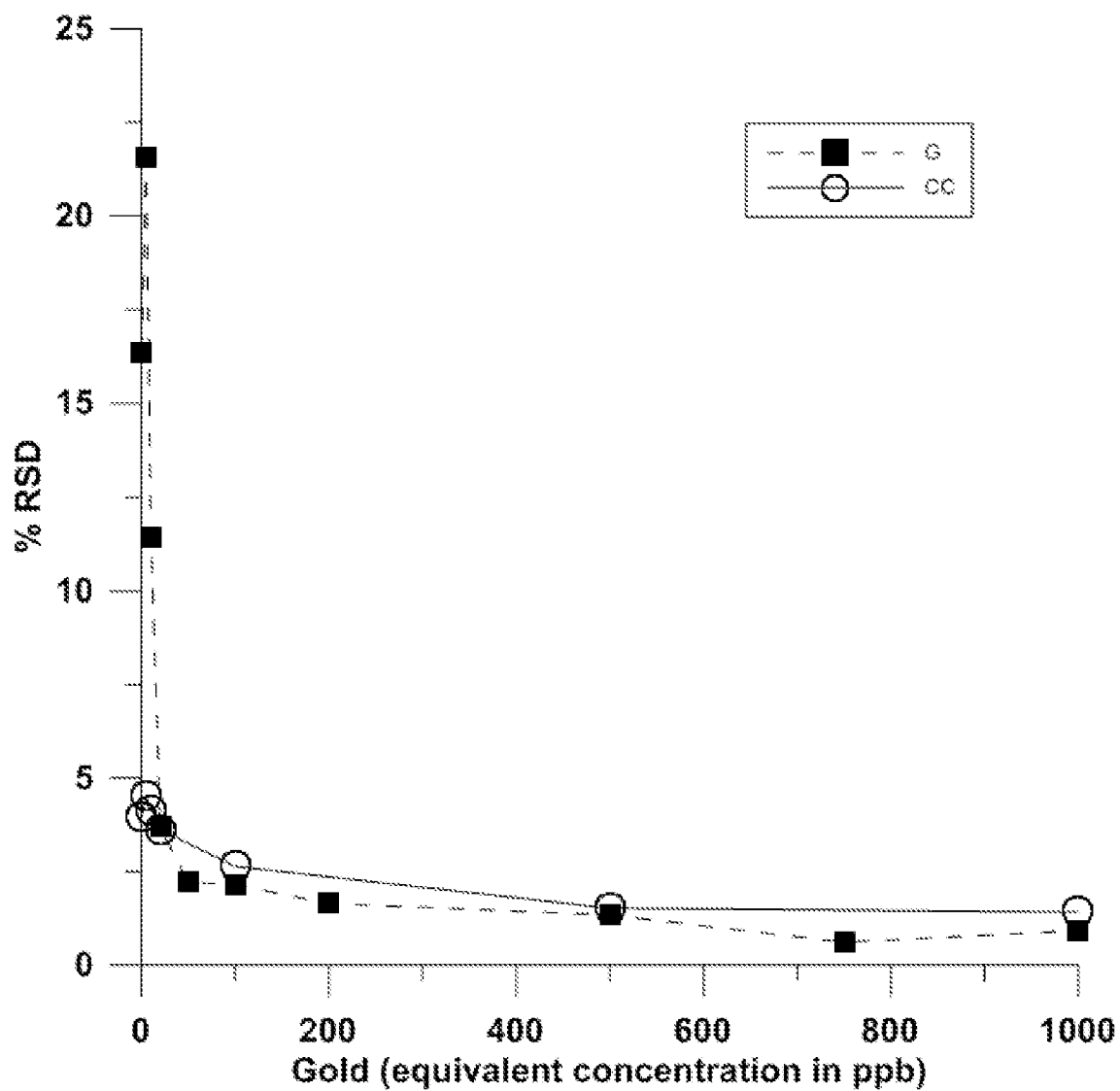
FIG. 7 is a graphical representation showing a measure of error in XRF measurements of gold at high concentrations adsorbed on carbon granules (G) in comparison with gold adsorbed on activated carbon cloth; and, FIG. 8 is a graphical representation of gold concentrations measured by XRF versus expected gold concentrations.

FIGS. 6 and 7, show the margins of error in measurement of gold adsorbed on carbon granules (G) and activated carbon cloth (CC) at low and high gold concentrations, respectively. The size of the error measured at low gold concentrations is consistently lower when gold is adsorbed on activated carbon cloth rather than carbon granules, whereas the error for high gold concentrations is similar regardless of whether gold is adsorbed on activated carbon cloth or carbon granules.

Figure 8:
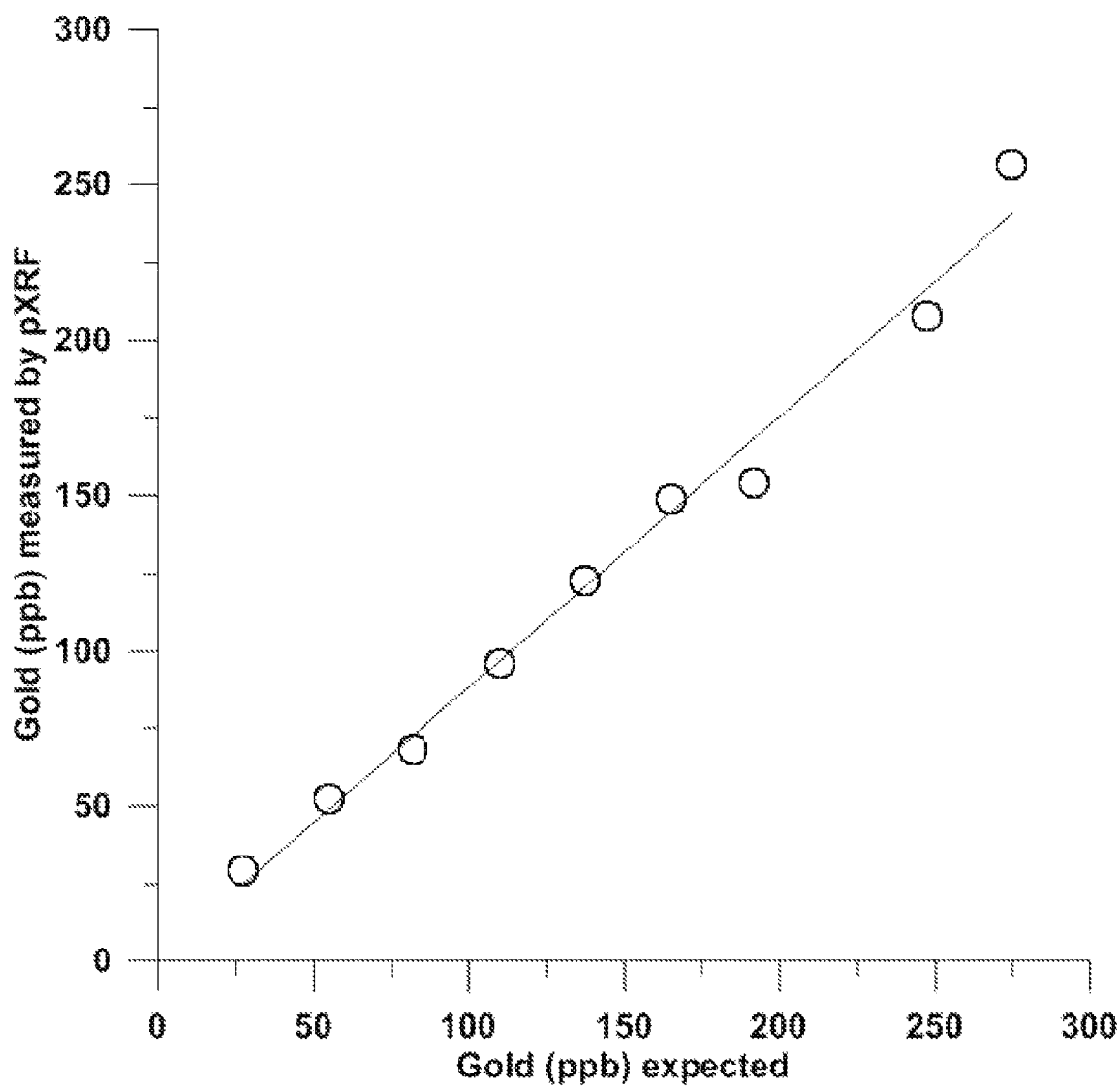

FIG. 8 shows a graphical representation of XRF-measured concentrations for gold adsorbed on carbon from a sample that has been digested by the methods described herein compared with gold expected in the sample based on independent laboratory measurements and results. Comparisons between expected data and actual data produced $R^2=0.9093$. Aliquots of in-house standards were diluted with barren quartz to a set weight of 250 g to produce a regression coefficient for expected vs actual data of $R^2=0.9093$ (FIG. 8).

The invention claimed is:

1. A system for a metal analysis of a digestion mixture comprising an exploration sample containing a dissolved metal or a dissolved metalloid not directly detectable by XRF comprising:
   a collector device comprising an adsorbent material capable of adsorbing the dissolved metal or the dissolved metalloid from the digestion mixture; and
   an XRF detector arranged to detect the adsorbed metal or the adsorbed metalloid on the collector device,
   wherein the adsorbent material is configured for an association with an analysis window of the XRF detector to facilitate a determination by the XRF detector of an amount of the dissolved metal or the dissolved metalloid in the exploration sample, and
   wherein the XRF detector comprises an X-ray source.

2. The system of claim 1, wherein the XRF detector further comprises a portable X-ray fluorescence (pXRF) detector.

3. The system according to claim 1, wherein the absorbent material is further capable of concentrating the dissolved metal or the dissolved metalloid from the digestion mixture.

4. A method of analysing an exploration sample containing a metal or a metalloid not directly detectable by XRF comprising the steps of:
   providing a digestion mixture comprising the exploration sample, a digestion medium, and a digestion composition or a digestion tablet containing an alkali compound and a metal lixiviant in an amount capable of dissolving the metal or the metalloid from the exploration sample in the digestion medium;
   contacting the digestion mixture with a collector device comprising an adsorbent material capable of adsorbing the dissolved metal or the dissolved metalloid from the digestion mixture, wherein the adsorbent material is configured for an association with an analysis window of an XRF detector to facilitate a determination by the XRF detector of an amount of the metal or the metalloid in the exploration sample;
   associating the collector device having the adsorbed metal or the adsorbed metalloid thereon with the XRF detector; and measuring a concentration of the adsorbed metal or the adsorbed metalloid on the collector device with the XRF detector, wherein the XRF detector comprises an X-ray source.

5. The method of claim 4, wherein the contacting step is performed for less than 24 hours.

6. The method according to claim 4, wherein the absorbent material is further capable of concentrating the dissolved metal or the dissolved metalloid from the digestion mixture.

7. A method of analysing an exploration sample containing gold at a concentration not directly detectable by XRF comprising the steps of:

providing a digestion mixture comprising the exploration sample, a digestion medium, and a digestion composition or a digestion tablet containing an alkali compound and a metal lixiviant in an amount capable of dissolving gold from the exploration sample in the digestion medium;

contacting the digestion mixture with a collector device comprising an adsorbent material capable of adsorbing gold from the digestion mixture;

associating the collector device having the gold adsorbed thereon with an XRF detector, wherein the adsorbent material is configured for an association with an analysis window of the XRF detector to facilitate a determination by the XRF detector of an amount of gold in the exploration sample; and measuring a concentration of the adsorbed gold on the collector device with the XRF detector.

8. The method according to claim 7, wherein the absorbent material is further capable of concentrating gold from the digestion mixture.

9. A system for preparing an exploration sample containing a metal or a metalloid not directly detectable by XRF for analysis by an XRF detector comprising:

a digestion composition or a digestion tablet containing an alkali compound and a metal lixiviant;

a vessel for receiving the exploration sample, the digestion composition or the digestion tablet, and a digestion medium, the vessel having a closure for the vessel to allow the vessel to be agitated and thereby produce a digestion mixture comprising a dissolved metal or a dissolved metalloid and the digestion composition or the digestion tablet dissolved in the digestion medium; and a collector device comprising an adsorbent material capable of adsorbing the dissolved metal or the dissolved metalloid from the digestion mixture, wherein the adsorbent material is configured for an association with an analysis window of the XRF detector to facilitate a determination by the XRF detector of an amount of the metal or the metalloid in the exploration sample, wherein the XRF detector comprises an X-ray source.

10. The system according to claim 9, wherein the absorbent material is further capable of concentrating the dissolved metal or the dissolved metalloid from the digestion mixture.

11. A sample preparation vessel for preparing an exploration sample containing a metal or a metalloid not directly detectable by XRF for an analysis by an XRF detector, wherein the sample preparation vessel comprises:

a vessel for receiving the exploration sample, a digestion composition or a digestion tablet, and a digestion medium;

a closure for the vessel to allow the vessel to be agitated and thereby produce a digestion mixture comprising a dissolved metal or a dissolved metalloid and the digestion composition or the digestion tablet dissolved in the digestion medium; and a collector device comprising an adsorbent material capable of adsorbing the dissolved metal or the dissolved metalloid from the digestion mixture, wherein the adsorbent material is configured for an association with an analysis window of the XRF detector to facilitate a determination by the XRF detector of an amount of the metal or the metalloid in the exploration sample, wherein the closure and the collector device are coupled in a manner whereby the collector device is retrieved from the vessel by removing the closure therefrom, wherein the XRF detector comprises an X-ray source.

12. The sample preparation vessel of claim 11, further comprising: an elongate element, wherein the closure and the collector device are coupled by the elongate element.

13. The sample preparation vessel of claim 12, wherein the elongate element is flexible.

14. The sample preparation vessel of claim 12, wherein the elongate element is rigid.

15. The sample preparation vessel of claim 12, further comprising: a permeable housing, wherein the closure is coupled to the permeable housing containing the collector device by the elongate element.

16. The sample preparation vessel according to claim 11, wherein the absorbent material is further capable of concentrating the dissolved metal or the dissolved metalloid from the digestion mixture.

17. A collector device for determining a metal or a metalloid in an exploration sample not directly detectable by XRF, the collector device comprising: an adsorbent material, wherein the adsorbent material comprises a plate, and wherein the adsorbent material is capable of adsorbing a dissolved metal or a dissolved metalloid from a digestion mixture produced by digesting the exploration sample, wherein the adsorbent material is configured for an association with an analysis window of an XRF detector to facilitate a determination by the XRF detector of an amount of the metal or the metalloid in the exploration sample, and wherein the XRF detector comprises an X-ray source.

18. A collector device for determining a metal or a metalloid in an exploration sample not directly detectable by XRF, the collector device comprising: an adsorbent material, wherein the adsorbent material comprises a textile material, wherein the adsorbent material is capable of adsorbing a dissolved metal or a dissolved metalloid from a digestion mixture produced by digesting the exploration sample, wherein the adsorbent material is configured for an association with an analysis window of an XRF detector to facilitate a determination by the XRF detector of an amount of the metal or the metalloid in the exploration sample, and wherein the XRF detector comprises an X-ray source.

19. The collector device of claim 18, wherein the textile material comprises an activated carbon cloth.

20. The collector device of claim 18, further comprising a permeable housing for the adsorbent material.

21. The collector device of claim 20, wherein the permeable housing comprises a mesh envelope.

22. A collector device for determining a metal or a metalloid in an exploration sample not directly detectable by XRF, the collector device comprising: an absorbent material, wherein the adsorbent material comprises a bed of adsorbent material, wherein the adsorbent material is capable of adsorbing a dissolved metal or a dissolved metalloid from a digestion mixture produced by digesting the exploration sample, wherein the adsorbent material is configured for an association with an analysis window of an XRF detector to facilitate a determination by the XRF detector of an amount of the metal or the metalloid in the exploration sample, and wherein the XRF detector comprises an X-ray source.

23. The collector device of claim 22, further comprising: a vessel including an interior space, wherein the interior space contains the adsorbent material.

24. The collector device of claim 22, wherein the adsorbent material comprises activated carbon granules or ion exchange resin beads.

25. A digestion composition comprising: a metal lixiviant and an alkali compound in 1 ppm to 10,000 ppm.

26. The digestion composition according to claim 25, further comprising: an accelerant and/or a pH indicator.

27. The digestion composition of claim 25, wherein the metal lixiviant is in an amount sufficient to dissolve a metal or a metalloid from a digestion mixture comprising an exploration sample containing low-levels of the metal or the metalloid, and a digestion medium.

28. The digestion composition of claim 25, wherein the metal lixiviant comprises a water soluble cyanide compound, a water soluble thiosulphate compound, or a water soluble iodide compound.

29. The digestion composition of claim 25, further comprising: an accelerant selected from a group consisting of: an alkali or alkali earth metal peroxide, an alkali or alkali earth metal percarbonate, an organic peroxide or an organic percarbonate.

30. The digestion composition of claim 25, wherein the alkali compound comprises an alkali metal hydroxide, an alkaline earth metal hydroxide, lime (CaO), soda ($Na_2O$), or a combination thereof.

31. The digestion composition of claim 25, wherein the alkali compound is present in an amount sufficient to maintain a pH of a digestion mixture above pH 7.

32. The digestion composition of claim 31, wherein the alkali compound is present in an amount sufficient to maintain a pH of a digestion mixture above pH 10.

33. The digestion composition of claim 25, further comprising: an ionic salt in an amount sufficient to maintain an ionic strength of a digestion mixture to at least 0.01M.

34. The digestion composition of claim 33, wherein the ionic salt is in an amount sufficient to maintain an ionic strength of a digestion mixture to at least 0.1M.

35. A digestion tablet comprising:
a core portion containing a metal lixiviant;
a layer of alkali compound encompassing the core portion; and
an overcoat layer comprising a water soluble polymer or a water dispersible polymer.

36. A digestion tablet comprising:
a core portion containing a mixture of a metal lixiviant and an alkali compound; and
an overcoat layer comprising a water soluble polymer or a water dispersible polymer.

37. The digestion tablet of claim 36, wherein the metal lixiviant is in an amount sufficient to dissolve a metal or a metalloid from a digestion mixture comprising an exploration sample containing low-levels of the metal or the metalloid and a digestion medium.

38. The digestion tablet of claim 36, wherein the metal lixiviant comprises a water soluble cyanide compound.

39. The digestion tablet of claim 36, wherein the metal lixiviant comprises a water soluble thiosulphate compound.

40. The digestion tablet of claim 36, wherein the metal lixiviant comprises a water soluble iodide compound.

41. The digestion tablet of claim 36, further comprising: an accelerant selected from a group consisting of: an alkali or alkali earth metal peroxide, an alkali or alkali earth metal percarbonate, an organic peroxide or an organic percarbonate.

42. The digestion tablet of claim 36, wherein the alkali compound comprises an alkali metal hydroxide, an alkaline earth metal hydroxide, lime (CaO), soda ($Na_2O$), or a combination thereof.

43. The digestion tablet of claim 36, wherein the alkali compound is present in an amount sufficient to maintain a pH of a digestion mixture above pH 7.

44. The digestion tablet of claim 43, wherein the alkali compound is present in an amount sufficient to maintain a pH of a digestion mixture above pH 10.

45. The digestion tablet of claim 36, further comprising: an ionic salt in an amount sufficient to maintain an ionic strength of a digestion mixture to at least 0.01M.

46. The digestion tablet of claim 45, wherein the ionic salt is in an amount sufficient to maintain the ionic strength of a digestion mixture to at least 0.1M.

* * * * *